US011883880B2

(12) United States Patent
Shiratori et al.

(10) Patent No.: US 11,883,880 B2
(45) Date of Patent: Jan. 30, 2024

(54) ALLOY, ALLOY POWDER, ALLOY MEMBER, AND COMPOSITE MEMBER

(71) Applicant: Proterial, Ltd., Tokyo (JP)

(72) Inventors: Hiroshi Shiratori, Tokyo (JP); Kazuya Shinagawa, Tokyo (JP); Kousuke Kuwabara, Tokyo (JP); Shuho Koseki, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 1 day.

(21) Appl. No.: 17/765,731

(22) PCT Filed: Mar. 31, 2021

(86) PCT No.: PCT/JP2021/013889
§ 371 (c)(1),
(2) Date: Mar. 31, 2022

(87) PCT Pub. No.: WO2021/201118
PCT Pub. Date: Oct. 7, 2021

(65) Prior Publication Data
US 2022/0364207 A1 Nov. 17, 2022

(30) Foreign Application Priority Data

Mar. 31, 2020 (JP) ................. 2020-064437

(51) Int. Cl.
| | | |
|---|---|---|
| C22C 19/05 | (2006.01) | |
| B22F 1/00 | (2022.01) | |
| B22F 10/28 | (2021.01) | |
| B22F 7/02 | (2006.01) | |
| C22C 1/04 | (2023.01) | |
| B33Y 10/00 | (2015.01) | |
| B33Y 70/00 | (2020.01) | |
| B33Y 80/00 | (2015.01) | |

(52) U.S. Cl.
CPC ............... *B22F 1/00* (2013.01); *B22F 7/02* (2013.01); *B22F 10/28* (2021.01); *C22C 1/0433* (2013.01); *C22C 19/055* (2013.01); *C22C 19/056* (2013.01); *B22F 2301/15* (2013.01); *B22F 2303/01* (2013.01); *B22F 2304/10* (2013.01); *B22F 2999/00* (2013.01); *B33Y 10/00* (2014.12); *B33Y 70/00* (2014.12); *B33Y 80/00* (2014.12)

(58) Field of Classification Search
CPC ....... C22C 19/056; C22C 27/02; C22C 30/00; C22C 19/055; C22F 1/10; C22F 1/18; B22F 1/00; B22F 10/28; B22F 7/02
See application file for complete search history.

(56) References Cited

U.S. PATENT DOCUMENTS 4,425,300 A   1/1984   Teramoto et al.

FOREIGN PATENT DOCUMENTS

| | | |
|---|---|---|
| JP | H05-156396 A | 6/1993 |
| JP | H07-316696 A | 12/1995 |
| JP | 09-078217 A | 3/1997 |
| JP | 2014-221940 A | 11/2014 |
| JP | 2015-160965 A | 9/2015 |
| JP | 2016-216762 A | 12/2016 |
| WO | 2019/049594 A1 | 3/2019 |

OTHER PUBLICATIONS

English Abstract and English Machine Translation of Sugawara et al. (JP 07-316696) (Dec. 5, 1995).*
International Search Report, PCT/JP2021/013889, dated May 25, 2021 (4 pgs).
Chinese Office Action dated Jul. 28, 2022 for Chinese Patent Application No. 202180005565.7.

* cited by examiner

*Primary Examiner* — Jessee R Roe
(74) *Attorney, Agent, or Firm* — Volpe Koenig

(57) ABSTRACT

The present invention provides an alloy, an alloy powder, an alloy member, and a composite member which are excellent in corrosion resistance and wear resistance, have crack resistance, and are suitable for an additive manufacturing method and the like. An alloy and an alloy powder include, by mass %, Cr: 18 to 22%, Mo: 18 to 28%, Ta: 1.5 to 57%, C: 1.0 to 2.5%, Nb: 0 to 42%, Ti: 0 to 15%, V: 0 to 27%, Zr: 0 to 29%, and a remainder consisting of Ni and unavoidable impurities, where a molar ratio of (Ta+0.7Nb+Ti+0.6V+Zr)/C=0.5 to 1.5 is satisfied. An alloy member is an additively manufactured product or a cast having such a solidification structure, and the solidification structure is a dendrite-like crystal structure having a metal phase having a face-centered cubic structure and carbides.

5 Claims, 12 Drawing Sheets

[FIG. 1]
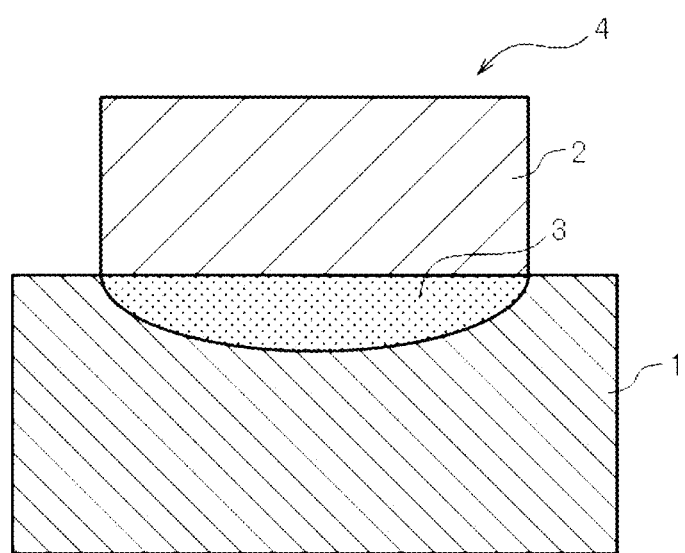

[FIG. 2]
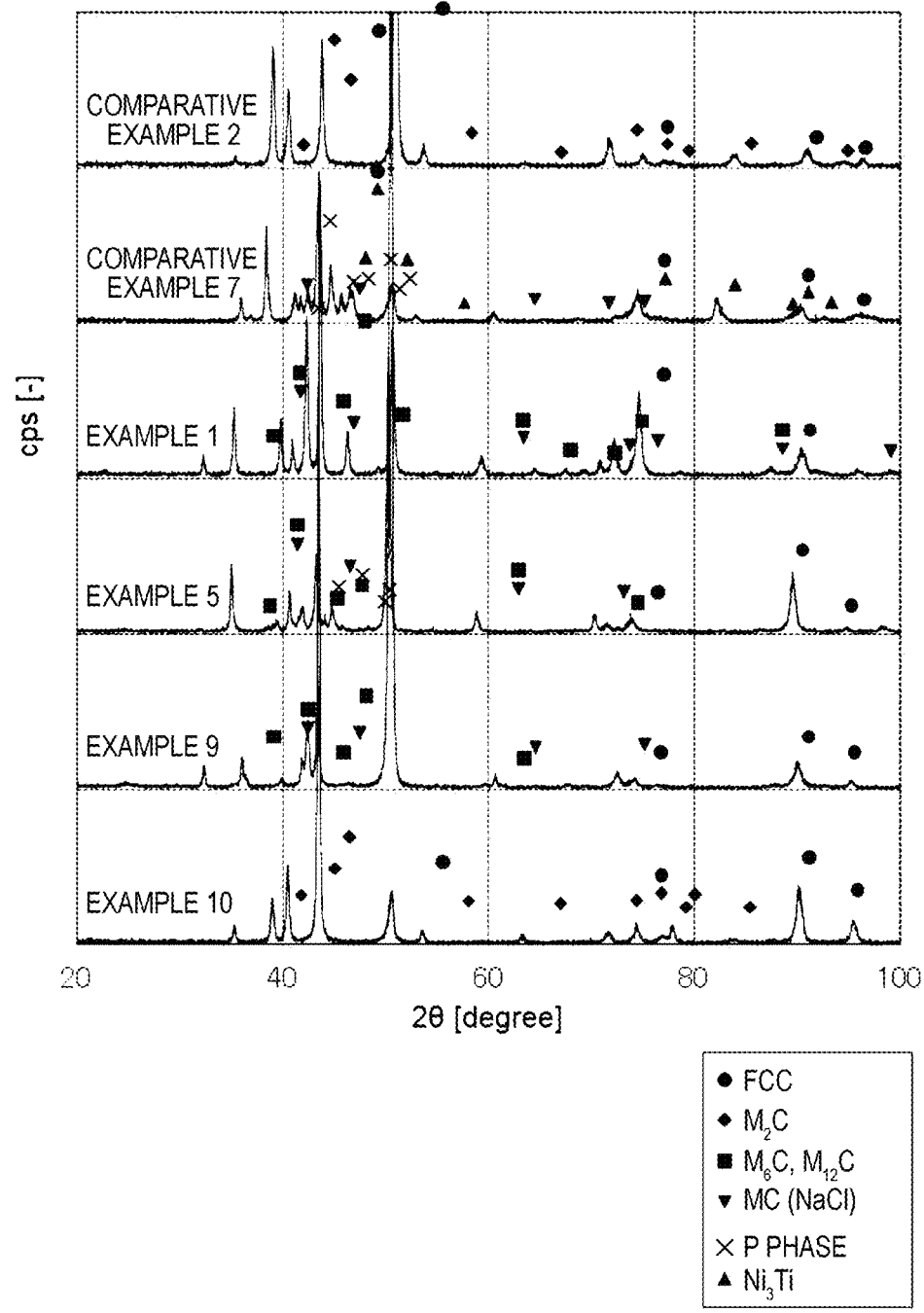

[FIG. 3A]
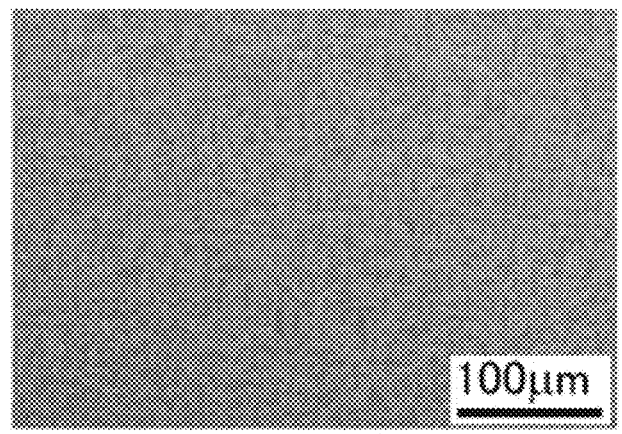
[FIG. 3B]
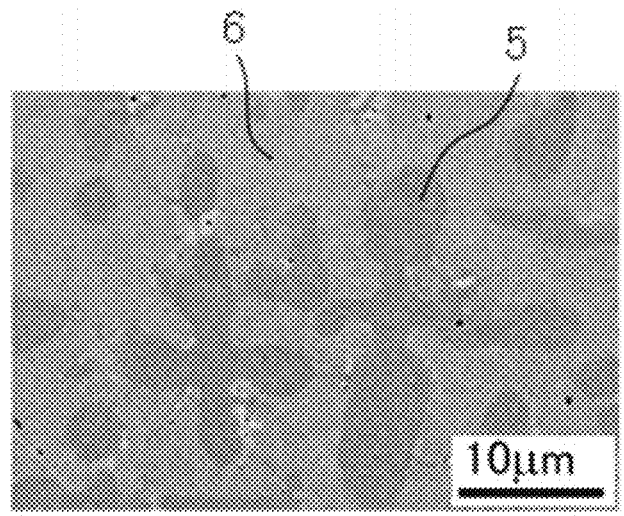

[FIG. 3C]
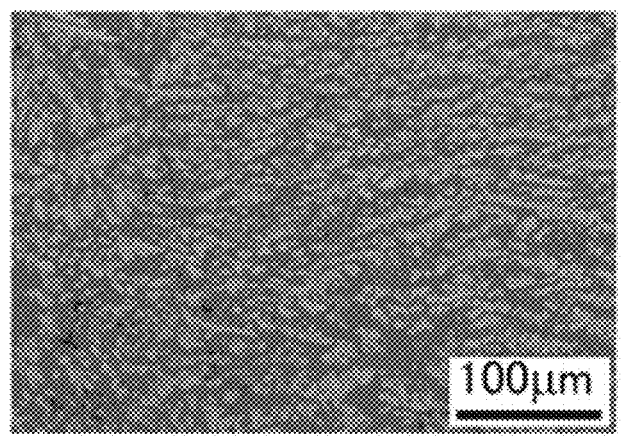
[FIG. 3D]
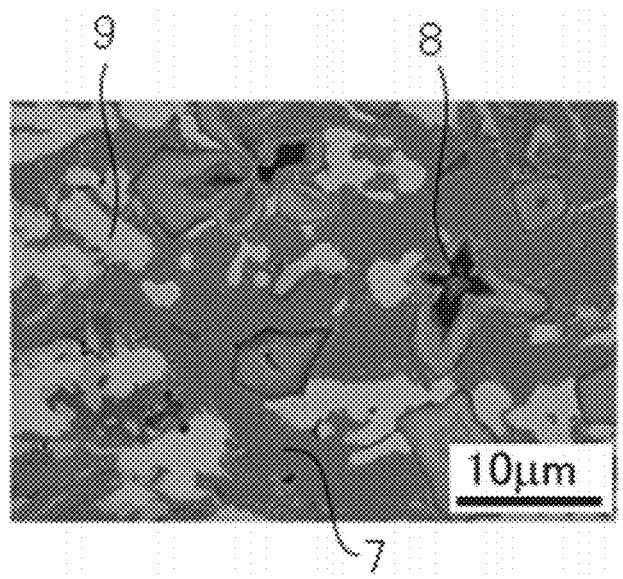

[FIG. 3E]
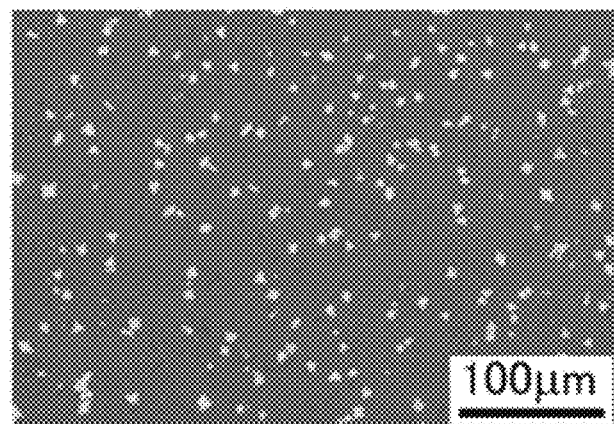
[FIG. 3F]
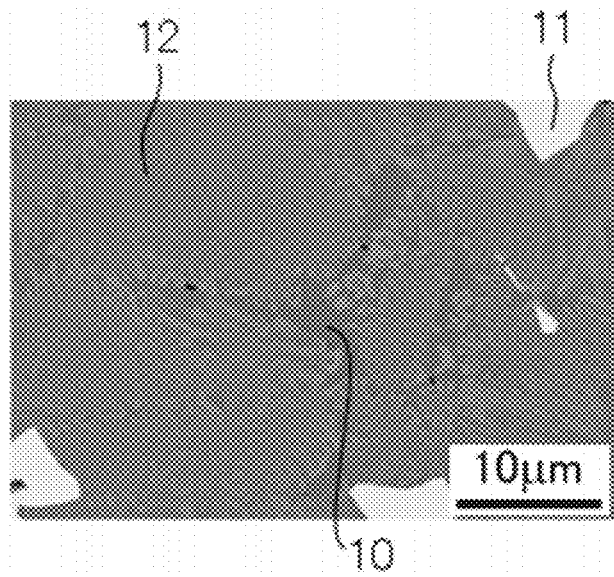

[FIG. 3G]
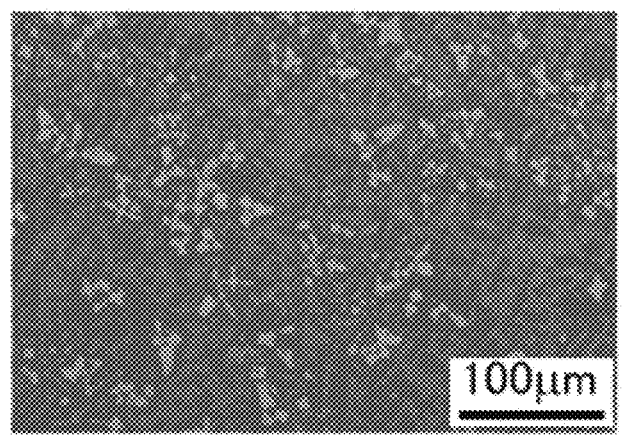
[FIG. 3H]
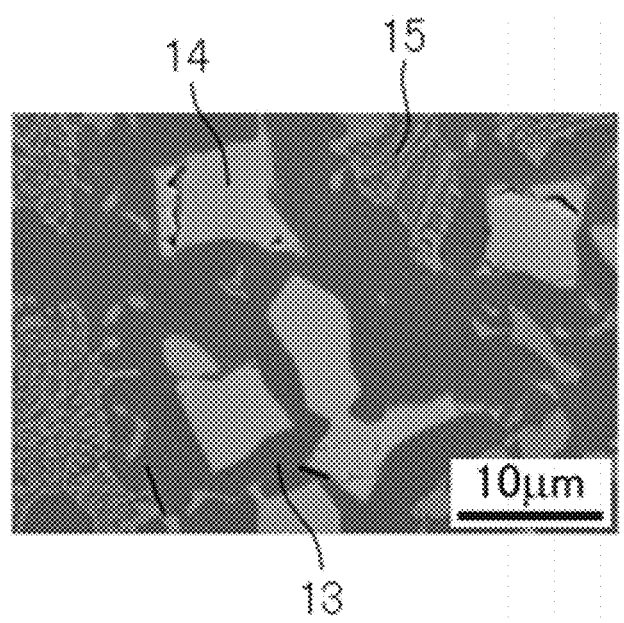

[FIG. 3I]
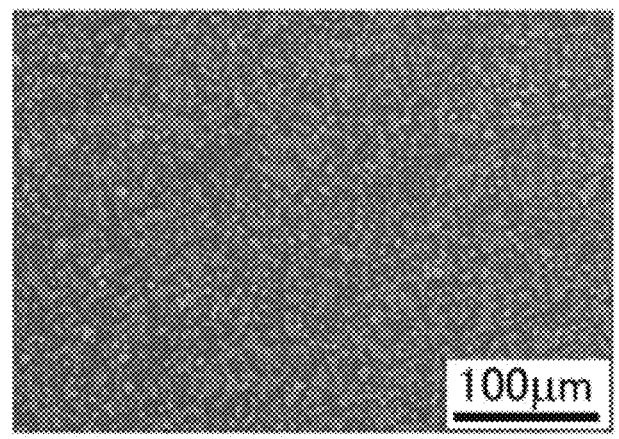
[FIG. 3J]
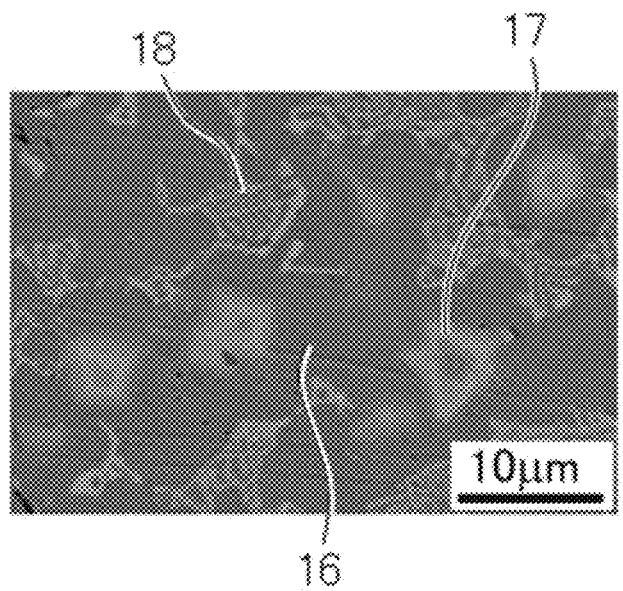

[FIG. 3K]
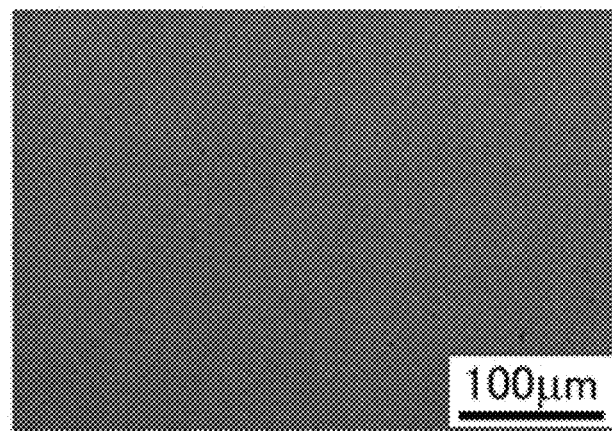
[FIG. 3L]
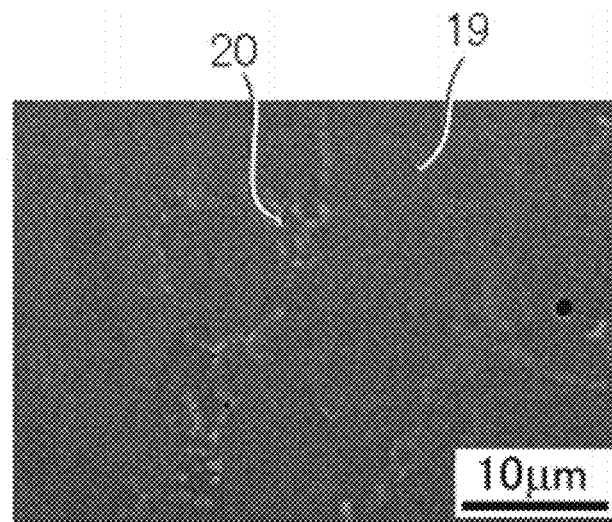

[FIG. 4]
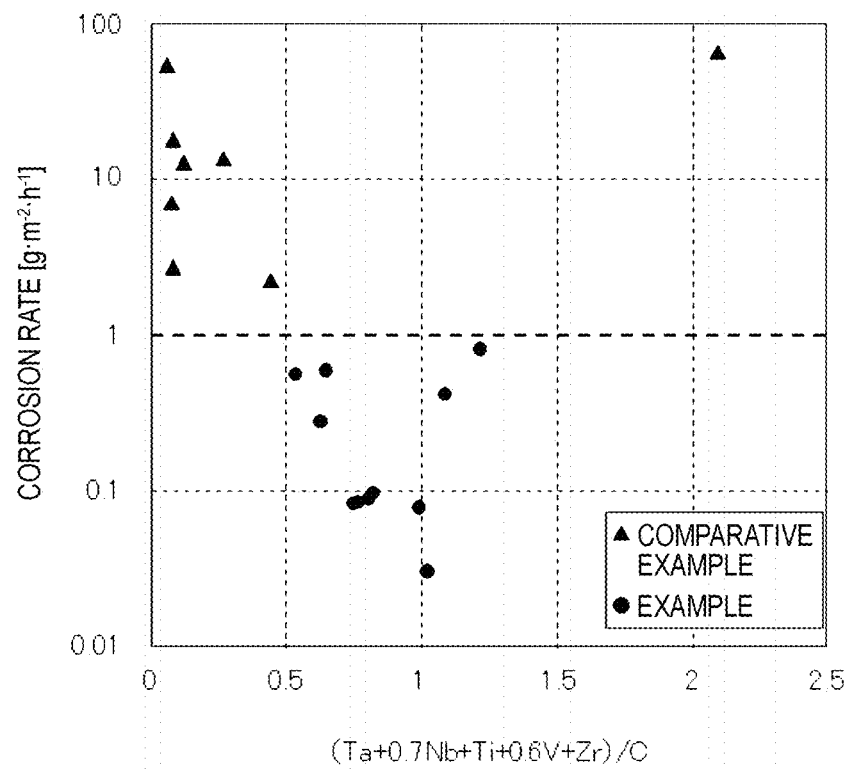

[FIG. 5A]
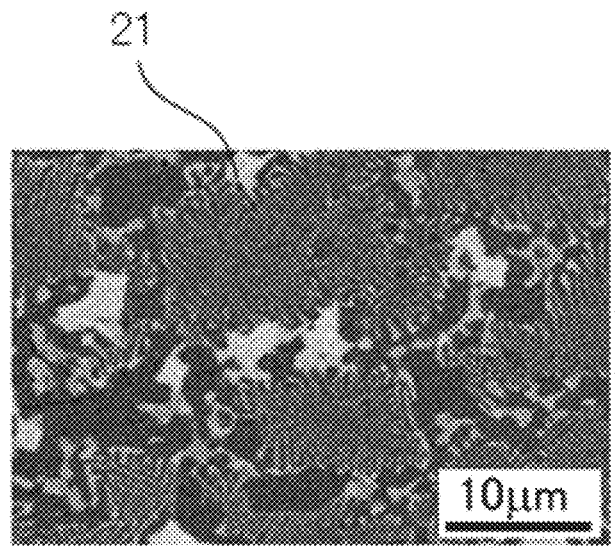
[FIG. 5B]
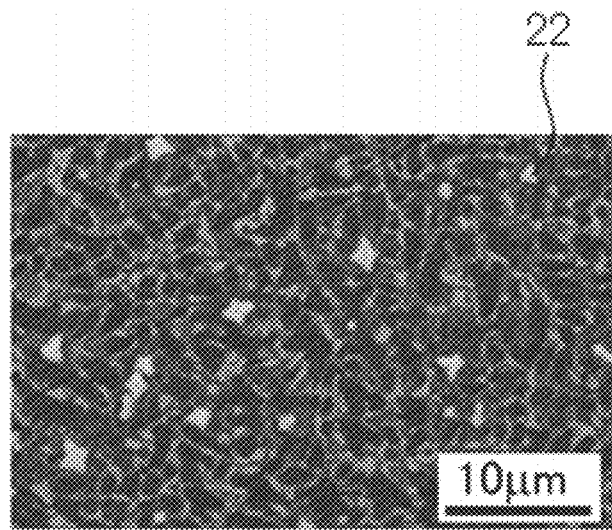

[FIG. 6]
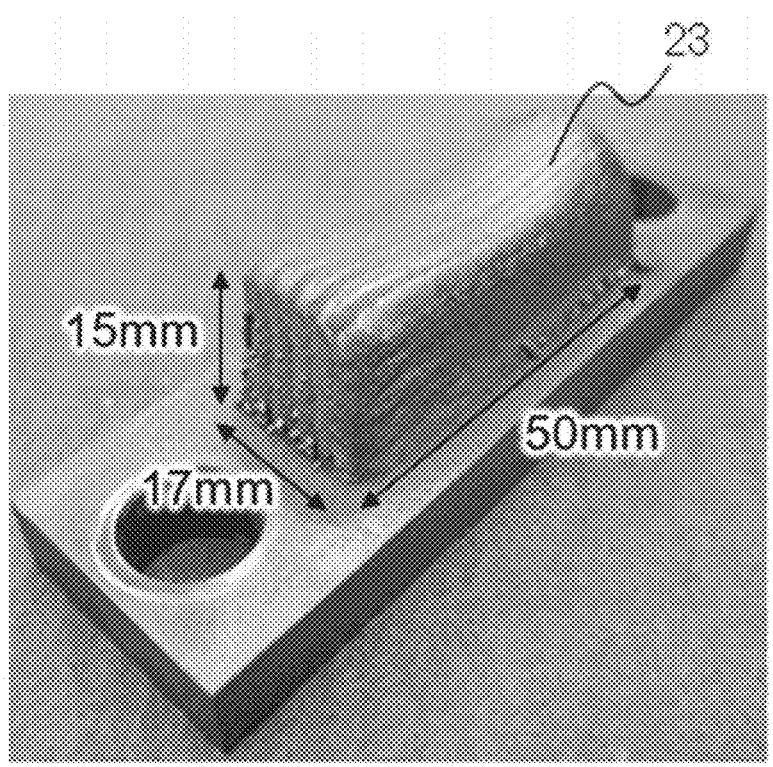

[FIG. 7]
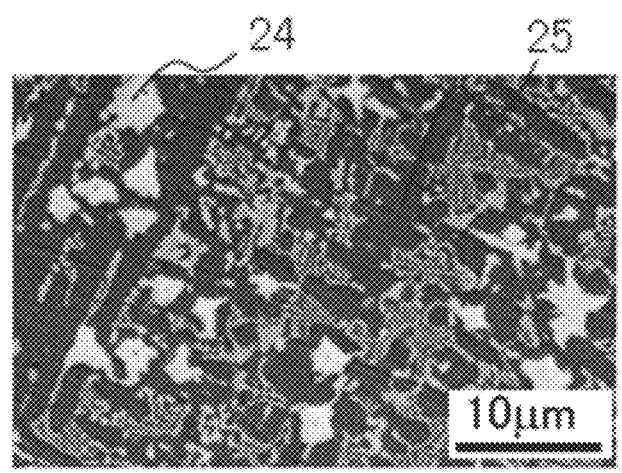

ALLOY, ALLOY POWDER, ALLOY MEMBER, AND COMPOSITE MEMBER

TECHNICAL FIELD

The present invention relates to an alloy, an alloy powder, an alloy member, and a composite member which are excellent in corrosion resistance and wear resistance, have crack resistance, and are suitable for an additive manufacturing method and the like.

BACKGROUND ART

An injection molding machine is provided with a screw that injects a melted resin into a mold while kneading the melted resin, in a cylinder that heats and melts an input resin. Since corrosive gas such as sulfurized gas may be generated when the resin is melted, the screw or cylinder for injection molding is required to have corrosion resistance to withstand the corrosive gas. Further, since glass fiber, carbon fiber and the like are added to the resin at the time of molding the fiber reinforced plastic, wear resistance, that is, hardness is also required.

In the related art, as an alloy having excellent corrosion resistance and high hardness, a Ni-based alloy (Ni—Cr—Mo-based alloy) having the highest amount of Ni by mass ratio and having the next highest amounts of Cr and Mo is known. JP-A-2015-160965 (PTL 1) describes a Ni-based alloy containing more than 18% by mass and less than 21% by mass Cr, more than 18% by mass and less than 21% by mass Mo, Ta, Mg, N, Mn, Si, Fe, Co, Al, Ti, V, Nb, B, and Zr, and having excellent hot forgeability and corrosion resistance.

However, PTL 1 does not disclose the hardness of this Ni-based alloy. According to the investigation conducted by the present inventors, it has been confirmed that the hardness of the Ni-based alloy to which Cr and Mo are added is approximately 20 to 30 HRC. At this level of hardness, wear resistance is insufficient in a case of being applied to screws or cylinders for injection molding.

In general, the wear resistance of a metal material increases when hard particles are dispersed in a crystal structure. JP-A-2014-221940 (PTL 2) discloses a Ni-based boride-dispersed corrosion-resistant and wear-resistant alloy in which a hard phase mainly composed of boride is dispersed in a Ni-based alloy to which Cr and Mo are added. Further, JP-A-5-156396 (PTL 3) discloses a Ni-based alloy for metalizing, in which carbides formed of at least one of Ti, Zr, Nb, V, and Ta are dispersed in a Ni-based alloy to which Cr and Mo are added.

CITATION LIST

Patent Literature

PTL 1: JP-A-2015-160965
PTL 2: JP-A-2014-221940
PTL 3: JP-A-5-156396

SUMMARY OF INVENTION

Technical Problem

The wear resistance of the alloy can be improved by a method of dispersing borides and carbides, as described in PTL 2 and PTL 3. However, when the amount of boride or carbide is extremely large, the corrosion resistance is lowered due to the intergranular segregation or the formation of a local cell of Cr. Further, depending on the amount of dispersion or the form of dispersion, the hardness becomes extremely high and the alloy becomes brittle.

In order to obtain an alloy having excellent corrosion resistance or wear resistance, it is necessary to optimize the addition amount or addition ratio of each element in consideration of element distribution, and it is required to achieve both corrosion resistance and wear resistance without breaking the balance. When the hardness of the Ni-based alloy is low, wear resistance is insufficient in a case of being applied to screws or cylinders for injection molding. Therefore, it is desired to further increase the hardness of such alloys.

Further, the Ni-based alloy of the related art in which borides or carbides are dispersed is often processed and molded by a sintering method or a hot isostatic press (HIP) method. However, the sintering method and the HIP method are manufacturing methods having a low degree of freedom in the shape of a workpiece. When the sintering method or the HIP method is used, it is difficult to manufacture a product having a complicated shape, and the application of the product is limited. Therefore, a more practical manufacturing method is required.

In addition to the sintering method or the HIP method, there is also a casting method or an additive manufacturing (AM) method as a method of processing metal materials. Since the degree of freedom in the shape of the workpiece is high, these manufacturing methods are suitable for manufacturing objects having complicated shapes. However, the casting method or the additive manufacturing method involves melting and solidification (hereinafter, may be referred to as melting/solidification) of a metal material. When these manufacturing methods are used for dispersion-reinforced Ni-based alloys, a large thermal stress is generated during melting/solidification, and thus cracks are likely to occur.

In general, it can be said that a carbide dispersive alloy can be manufactured more easily than a boride dispersive alloy because thermal refining is possible. However, in the additive manufacturing method, local melting/solidification of the metal powder is repeated, and thus, there is a problem that cracks due to thermal stress cannot be ignored. Under such circumstances, there is a demand for an alloy that can be used in a manufacturing process that involves melting/solidification, has excellent corrosion resistance, and is also excellent in wear resistance or crack resistance.

An object of the present invention is to provide an alloy, an alloy powder, an alloy member, and a composite member which are excellent in corrosion resistance and wear resistance, have crack resistance, and are suitable for additive manufacturing methods and the like.

Solution to Problem

In order to solve the above-described problems, an alloy according to the present invention includes, by mass %, Cr: 18 to 22%, Mo: 18 to 28%, Ta: 1.5 to 57%, C: 1.0 to 2.5%, Nb: 0 to 42%, Ti: 0 to 15%, V: 0 to 27%, Zr: 0 to 29%, and a remainder consisting of Ni and unavoidable impurities, where a molar ratio of (Ta+0.7Nb+Ti+0.6V+Zr)/C=0.5 to 1.5 is satisfied.

An alloy powder according to the present invention includes, by mass %, Cr: 18 to 22%, Mo: 18 to 28%, Ta: 1.5 to 57%, C: 1.0 to 2.5%, Nb: 0 to 42%, Ti: 0 to 15%, V: 0 to 27%, Zr: 0 to 29%, and a remainder consisting of Ni and unavoidable impurities, where a molar ratio of (Ta+0.7Nb+Ti+0.6V+Zr)/C=0.5 to 1.5 is satisfied.

An alloy member according to the present invention which is an additively manufactured product or a cast having a solidification structure, includes, by mass %, Cr: 18 to 22%, Mo: 18 to 28%, Ta: 1.5 to 57%, C: 1.0 to 2.5%, Nb: 0 to 42%, Ti: 0 to 15%, V: 0 to 27%, Zr: 0 to 29%, and a remainder consisting of Ni and unavoidable impurities, where a molar ratio of (Ta+0.7Nb+Ti+0.6V+Zr)/C=0.5 to 1.5 is satisfied, in which the solidification structure is a dendrite-like crystal structure having a metal phase having a face-centered cubic structure and carbides.

A composite member according to the present invention includes a base material and an alloy layer provided on a surface of the base material, in which the alloy layer which is an additively manufactured product having a solidification structure, includes, by mass %, Cr: 18 to 22%, Mo: 18 to 28%, Ta: 1.5 to 57%, C: 1.0 to 2.5%, Nb: 0 to 42%, Ti: 0 to 15%, V: 0 to 27%, Zr: 0 to 29%, and a remainder consisting of Ni and unavoidable impurities, where a molar ratio of (Ta+0.7Nb+Ti+0.6V+Zr)/C=0.5 to 1.5 is satisfied, in which the solidification structure is a dendrite-like crystal structure having a metal phase having a face-centered cubic structure and carbides.

Advantageous Effects of Invention

According to the present invention, it is possible to provide an alloy, an alloy powder, an alloy member, and a composite member which are excellent in corrosion resistance and wear resistance, have crack resistance, and are suitable for an additive manufacturing method and the like.

The problems, the configurations, and the effects other than those described above will be clarified from the description of the embodiments below.

BRIEF DESCRIPTION OF DRAWINGS

FIG. 1 is a sectional view schematically showing an example of a composite member using an alloy according to the present embodiment.

FIG. 2 is a diagram showing results of crystal structure analysis by X-ray diffraction measurement of Examples and Comparative Examples.

FIG. 3A is a backscattered electron image taken by a scanning electron microscope showing a metal structure of Comparative Example 2.

FIG. 3B is a backscattered electron image taken by the scanning electron microscope showing the metal structure of Comparative Example 2.

FIG. 3C is a backscattered electron image taken by the scanning electron microscope showing a metal structure of Comparative Example 7.

FIG. 3D is a backscattered electron image taken by the scanning electron microscope showing a metal structure of Comparative Example 7.

FIG. 3E is a backscattered electron image taken by the scanning electron microscope showing a metal structure of Example 1.

FIG. 3F is a backscattered electron image taken by the scanning electron microscope showing the metal structure of Example 1.

FIG. 3G is a backscattered electron image taken by the scanning electron microscope showing a metal structure of Example 5.

FIG. 3H is a backscattered electron image taken by the scanning electron microscope showing the metal structure of Example 5.

FIG. 3I is a backscattered electron image taken by the scanning electron microscope showing a metal structure of Example 9.

FIG. 3J is a backscattered electron image taken by the scanning electron microscope showing the metal structure of Example 9.

FIG. 3K is a backscattered electron image taken by the scanning electron microscope showing a metal structure of Example 10.

FIG. 3L is a backscattered electron image taken by the scanning electron microscope showing the metal structure of Example 10.

FIG. 4 is a diagram showing a relationship between a chemical component and a corrosion rate of Examples and Comparative Examples.

FIG. 5A is a backscattered electron image taken by the scanning electron microscope showing a metal structure in which the alloy of Example 5 was dissolved and solidified with a laser having a high scanning rate.

FIG. 5B is a backscattered electron image taken by the scanning electron microscope showing a metal structure in which the alloy of Example 5 was dissolved and solidified with a laser having a high scanning rate.

FIG. 6 is a photographic image showing an appearance of an additively manufactured product of a sample No. 3.

FIG. 7 is a backscattered electron image taken by the scanning electron microscope showing a metal structure of the additively manufactured product of the sample No. 3.

DESCRIPTION OF EMBODIMENTS

Hereinafter, an alloy, an alloy powder suitable for an additive manufacturing method, an alloy member, and a composite member using the alloy powder according to an embodiment of the present invention will be described. First, the alloy will be described. Then, the alloy member, the alloy powder, the additive manufacturing method, and the solidification structure of the alloy will be described.

In addition, in this specification, % indicating the amount of an element means % by mass. Further, the numerical range represented by using "to" means that the numerical values described before and after "to" are included as a lower limit value and an upper limit value. The upper limit value and the lower limit value described before and after "to" can be combined randomly.

[Ni—Cr—Mo-Based Alloy]

The alloy according to the present embodiment includes an FCC phase having a face-centered cubic (FCC) structure and a carbide phase. The FCC phase is composed of a Ni-based alloy having the highest amount of Ni by mass ratio and having the next highest amounts of Cr and Mo, with Cr, Mo, and Ni as the main constituent elements. The carbide phase contains Ta, Nb, Ti, V, and Zr, which are sub-constituent elements. Ni, Cr, Mo, Ta, and C are essential elements that are always contained in the alloy according to the present embodiment. Nb, Ti, V, and Zr are elements that are added randomly and may or may not be contained in the alloy according to the present embodiment.

In the alloy according to the present embodiment, Cr and Mo among the main constituent elements are preferably Cr: 18 to 22% by mass and Mo: 18 to 28% by mass. Further, Ta and C among the sub-constituent elements are preferably Ta: 1.5 to 57% by mass and C: 1.0 to 2.5% by mass. In addition, Nb, Ti, V, and Zr among the sub-constituent elements are preferably Nb: 0 to 42% by mass, Ti: 0 to 15% by mass, V: 0 to 27% by mass, and Zr: 0 to 29% by mass.

In the alloy according to the present embodiment, the substantial remainder with respect to the total mass fraction of Ni, Cr, Mo, Ta, and C, which are the essential elements, is composed of Ni and unavoidable impurities. Otherwise, the substantial remainder with respect to the total mass fraction of Ni, Cr, Mo, Ta, and C, which are the essential elements, and Nb, Ti, V, Zr, and the like, which are optional elements, is composed of Ni and unavoidable impurities. Examples of the optional element that can be added randomly include Y, Hf, W, B, and the like in addition to Nb, Ti, V, and Zr, which are sub-constituent elements.

Here, the details of the chemical component and the amount of the alloy will be described.

(Cr: 18 to 22%)

Cr has an effect of improving corrosion resistance. In particular, the formation of a passivation film gives corrosion resistance to nitric acid, sulfuric acid, and the like. When Cr is less than 18%, the effect of improving corrosion resistance cannot be obtained. On the other hand, when Cr exceeds 22%, intermetallic compounds such as a coarse µ phase ($Ni_7Mo_6$ and the like) or a P phase ($Mo_3(Mo,Cr)_5Ni_6$ and the like) are formed in combination with Mo and the like, and corrosion resistance and crack resistance are lowered. Further, when a carbide-forming element such as Ta, Nb, Ti, V, Zr, Y, Hf, or W is added, the concentration of Cr with respect to the carbide or the grain boundary is suppressed, and thus it is not required to excessively add Cr. Therefore, the amount of Cr is set to 18 to 22%.

The lower limit of the amount of Cr is preferably 18.5%, more preferably 19%, from the viewpoint of improving corrosion resistance, and the like. In addition, the upper limit of the amount of Cr is preferably 21%, more preferably 20%, from the viewpoint of suppressing the formation of intermetallic compounds.

(Mo: 18 to 28%)

Mo has the effect of improving corrosion resistance. In particular, in combination with Cr, the passivation film is densely strengthened, and excellent corrosion resistance to hydrochloric acid, sulfuric acid, hydrofluoric acid, and the like can be obtained. When Mo is less than 18%, the effect of improving the corrosion resistance by Mo cannot be sufficiently obtained in combination with Cr. On the other hand, when Mo exceeds 28%, an $M_6C$ type carbide or an $M_{12}C$ type carbide increases in proportion to the amount of Mo, and thus the crack resistance is significantly lowered. When the alloy powder is used in the additive manufacturing method, the additively manufactured product becomes easy to crack, and it becomes difficult to perform appropriate modeling. Further, since Mo is easily oxidized at a high temperature, an oxide film is easily formed on the surface of the alloy powder when the alloy powder is manufactured by a gas atomizing method or the like. When the powder particles on which the oxide film is formed are used in the additive manufacturing method, a smoke phenomenon occurs in which the powder soars during the building, or the powder is mixed as an impurity in the additively manufactured product. Therefore, the amount of Mo is set to 18 to 28%.

The lower limit of the amount of Mo is preferably 19%, more preferably 20%, from the viewpoint of improving corrosion resistance, and the like. In addition, the upper limit of the amount of Mo is preferably 26%, more preferably 24%, from the viewpoint of improving crack resistance and modeling properties, and the like.

(Ta: 1.5 to 57%)

Ta has the effect of improving corrosion resistance. In particular, in combination with Cr, the passivation film is remarkably strengthened and improved, and excellent corrosion resistance can be obtained. Further, Ta is a carbide-forming element having a lower free energy for forming carbides than Mo, and forms carbides in the matrix phase to contribute to the improvement of wear resistance. In particular, in combination with Cr or Mo, the passivation film is remarkably strengthened, and thus the corrosion resistance to acid can be greatly improved. When Ta is less than 1.5%, the effect of improving the corrosion resistance by Ta cannot be sufficiently obtained. On the other hand, when the amount of Ta is extremely large, the intermetallic compounds increase and the crack resistance is lowered, or Mo is concentrated in the intermetallic compound and the corrosion resistance is lowered. Therefore, the amount of Ta is set to 1.5 to 57%.

The lower limit of the amount of Ta is preferably 1.8%, more preferably 2.0%, from the viewpoint of improving corrosion resistance or wear resistance, and the like. In addition, the upper limit of the amount of Ta is preferably 50%, more preferably 43%, from the viewpoint of suppressing the formation of intermetallic compounds.

(C: 1.0 to 2.5%)

C forms carbides to contribute to the improvement of wear resistance. C also contributes to the stabilization of the matrix phase having the FCC structure. When C is less than 1.0%, the effect of improving the wear resistance by carbides cannot be sufficiently obtained. On the other hand, when C exceeds 2.5%, the alloy becomes excessively hard and the crack resistance is lowered, or carbides are excessively formed and the corrosion resistance is lowered. Therefore, the amount of C is set to 1.0 to 2.5%.

The lower limit of the amount of C is preferably 1.2%, more preferably 1.4%, from the viewpoint of improving wear resistance, and the like. In addition, the upper limit of the amount of C is preferably 2.2%, more preferably 1.9%, from the viewpoint of ensuring crack resistance, and the like.

(Nb: 0 to 42%, Ti: 0 to 15%, V: 0 to 27%, Zr: 0 to 29%)

Further, Nb, Ti, V, and Zr are carbide-forming elements having a lower free energy for forming carbides than Mo, and form carbides in the matrix phase to contribute to the improvement of wear resistance. When Nb exceeds 42%, Ti exceeds 15%, V exceeds 27%, and Zr exceeds 29%, carbides are excessively produced and crack resistance or corrosion resistance is lowered. Therefore, the amount of Nb is limited to 42% or less, the amount of Ti is limited to 15% or less, the amount of V is limited to 27% or less, and the amount of Zr is limited to 29% or less.

The lower limit of the amount of Nb is preferably 4%, more preferably 9%, when positively added. The upper limit of the amount of Nb is preferably 37%, more preferably 32%. Since Nb has a lower free energy for forming carbides than Mo, stabilization becomes easier as carbides than Mo dissolved in the matrix phase. Forming carbides while maintaining the amount of Mo dissolved in the matrix phase is effective in improving the hardness of the alloy while maintaining the corrosion resistance of the matrix phase.

The lower limit of the amount of Ti is preferably 3%, more preferably 4%, when positively added. The upper limit of the amount of Ti is preferably 13.5%, more preferably 12%.

The lower limit of the amount of V is preferably 4.5%, more preferably 6%, when V is positively added. The upper limit of the amount of V is preferably 23.5%, more preferably 20%.

The lower limit of the amount of Zr is preferably 5%, more preferably 8%, when positively added. The upper limit of the amount of Zr is preferably 25.5%, more preferably 22%.

$$(0.5 \leq (Ta+0.7Nb+Ti+0.6V+Zr)/C \leq 1.5)$$

Amounts of Ta, Nb, Ti, V, and Zr satisfy the following Expression (I) in molar ratio:

$$0.5 \leq (Ta+0.7Nb+Ti+0.6V+Zr)/C \leq 1.5 \qquad (I)$$

However, in Expression (I), Ta, Nb, Ti, V, and Zr represent the molar ratios of each element, respectively.

Expression (I) experimentally obtains the range of the amounts of Ta, Nb, Ti, V, and Zr from the relationship with the corrosion rate of the alloy. Since Ta, Nb, Ti, V, and Zr have different free energies for forming carbides from each other, Nb and V are multiplied by experimentally obtained coefficients. In the following description, (Ta+0.7Nb+Ti+0.6V+Zr)/C may be referred to as an "exponential value".

When C is added to a Ni—Cr—Mo-based alloy, carbides having high hardness are formed, and thus wear resistance can be improved. However, when C exceeding the solid solubility limit is added to the alloy, $M_2C$ type carbides or $M_6C$ or $M_{12}C$ type carbides are crystallized, and Mo is concentrated in these carbides or at the grain boundary. When Mo is concentrated in carbides or at the grain boundary, the amount of Mo in the matrix phase is reduced, and thus the effect of Mo added to improve corrosion resistance cannot be sufficiently obtained, and excellent corrosion resistance cannot be obtained.

On the other hand, when Ta, Nb, Ti, V, and Zr, which have a lower free energy for forming carbides than Mo, are added, carbides mainly composed of these elements are formed, and thus the decrease in the amount of Mo in the matrix phase can be suppressed. However, when the exponential value is less than 0.5, since the amount of carbide-forming elements is less than that of C, the decrease in the amount of Mo in the matrix phase cannot be sufficiently suppressed, and the effect of improving the corrosion resistance cannot be sufficiently obtained. Further, when the exponential value exceeds 1.5, an intermetallic compound such as a P phase is formed by an excess amount of carbide-forming elements, and thus the crack resistance is lowered, or Cr or Mo is concentrated in the intermetallic compound and the corrosion resistance is lowered. Therefore, the exponential value is in the range of 0.5 to 1.5.

The lower limit of the exponential value is preferably 0.7, more preferably 0.85, from the viewpoint of sufficiently obtaining the effect of improving the corrosion resistance by Mo. The upper limit of the exponential value is preferably 1.3, more preferably 1.15, from the viewpoint of suppressing deterioration of crack resistance or corrosion resistance due to the formation of intermetallic compounds.

In the alloy according to the present embodiment, the following elements can be added randomly mainly for the purpose of improving the alloy characteristics and manufacturing.

(Y: 5.0% or Less)

Y has the effect of forming a stable protective film and improving oxidation resistance and corrosion resistance. In addition, since the atomic radius is relatively large, the alloy strength and wear resistance are also improved. When Y is 0.01% or more, the effect of adding Y can be obtained. On the other hand, when Y exceeds 5.0%, the amount of oxidation may increase and the oxidation resistance may decrease. Therefore, the amount of Y is set to 0.01 to 5.0% when positively added.

(Hf: 56% or Less)

Hf has a carbide-forming ability comparable to that of Ta, Ti, and Zr. When Hf is added, carbides mainly composed of Hf are formed, and corrosion resistance and wear resistance are improved. On the other hand, when an amount of Hf is excessive, there is a possibility that harmful intermetallic compounds are formed and crack resistance is lowered. Therefore, the amount of Hf is set to 0.01 to 56% when positively added. It is preferable that Hf be added as a partial substitute for one or more of Ta, Ti, and Zr, and the total amount of Hf with other carbide-forming elements in terms of % by atom be limited to the range of the same addition amount.

(W: 30% or Less)

W has a higher carbide-forming ability than Mo. In addition, since the atomic radius is large, it can be expected that the alloy strength and wear resistance will be improved by solid solution strengthening. When W is 0.01% or more, the effect of adding W can be obtained. On the other hand, when an amount of W is excessive, harmful intermetallic compounds are formed and crack resistance is lowered. Therefore, the amount of W is set to 0.01 to 30% when positively added.

(B: 1% or Less)

B can be expected to improve the alloy strength, especially the high temperature strength, by strengthening the grain boundary. In addition, improvement in wear resistance due to boride precipitation can be expected. When B is 0.001% or more, the effect of adding B can be obtained. On the other hand, when an amount of B is excessive, the crack resistance is lowered. Therefore, the amount of B is 0.001 to 1%, preferably 0.001 to 0.1% when positively added.

(Fe: 7.0% or Less)

Fe has a higher melting point than Ni and has the effect of increasing the viscosity of the molten metal. The metal powder used in the additive manufacturing method is usually manufactured by a method of solidifying the molten metal which has become droplets by an atomizing method or the like. When Fe is added, the amount of solid phase during solidification increases and the viscosity of the molten metal is increased, and thus it becomes easy to control the particle size of the metal powder. In addition, it is possible to suppress the formation of fine particles having a particle size of less than 5 μm, which is not suitable for the additive manufacturing method. When Fe is 0.01% or more, the effect of increasing the viscosity of the molten metal by Fe can be obtained. On the other hand, when Fe exceeds 7.0%, the corrosion resistance of the matrix phase to electrochemical corrosion is lowered. Therefore, the amount of Fe is set to 0.01 to 7.0% when positively added.

The lower limit of the amount of Fe is preferably 0.05%, more preferably 0.10%, when positively added. The upper limit of the amount of Fe is preferably 5.5%, more preferably 1.0%.

(Co: 2.5% or Less)

Co has a higher melting point than Ni and has the effect of increasing the viscosity of the molten metal. When Co is added, it becomes easy to control the particle size of the metal powder as in Fe. In addition, it is possible to suppress the formation of fine particles having a particle size of less than 5 μm, which is not suitable for the additive manufacturing method. When Co is 0.001% or more, the effect of increasing the viscosity of the molten metal by Co can be obtained. On the other hand, when Co exceeds 2.5%, micro-level shrinkage cavities are likely to occur in the solidified particles during the manufacturing of the alloy powder. Therefore, the amount of Co is set to 0.001 to 2.5% when positively added.

The lower limit of the amount of Co is preferably 0.005%, more preferably 0.010%, when positively added. The upper limit of the amount of Co is preferably 1.0%, more preferably 0.5%.

(Si: 0.2% or Less)

Si is a chemical component added as a deoxidizing agent and has an effect of improving the cleanliness of the molten metal. When the deoxidizing agent is added, the joints between the particles of the additively manufactured product become smooth when the alloy powder is used in the additive manufacturing method, and thus defects are less likely to occur in the additively manufactured product. When Si is 0.001% or more, the effect of adding Si can be obtained. On the other hand, when Si exceeds 0.2%, the corrosion resistance is lowered due to the intergranular segregation of the intermetallic compound by Si. Therefore, the amount of Si is set to 0.001 to 0.2% when positively added.

The lower limit of the amount of Si is preferably 0.002%, more preferably 0.005%, when positively added. The upper limit of the amount of Si is preferably 0.1%, more preferably 0.01%.

(Al: 0.5% or Less)

Al is a chemical component added as a deoxidizing agent and has an effect of improving the cleanliness of the molten metal. When Al is 0.01% or more, the effect of adding Al can be obtained. On the other hand, when Al exceeds 0.5%, oxides are likely to be formed on the surface of the particles at the time of melting/solidification when the alloy powder is used in the additive manufacturing method. When the powder on which the oxide film is formed is used in the additive manufacturing method, problems such as a smoke phenomenon occur during the building, or impurities are mixed in the additively manufactured product. Therefore, the amount of Al is set to 0.01 to 0.5% when positively added.

The lower limit of the amount of Al is preferably 0.03%, more preferably 0.05%, when positively added. The upper limit of the amount of Al is preferably 0.4%, more preferably 0.3%.

(Cu: 0.25% or Less)

Cu has the effect of improving the corrosion resistance of the matrix phase to electrochemical corrosion. In particular, excellent corrosion resistance to non-oxidizing acids such as hydrochloric acid and hydrofluoric acid in a moist environment can be obtained. When Cu is 0.001% or more, the effect of improving the corrosion resistance by Cu can be obtained. On the other hand, when Cu exceeds 0.25%, oxides are likely to be formed on the surface of the particles at the time of melting/solidification when the alloy powder is used in the additive manufacturing method. When the powder on which the oxide film is formed is used in the additive manufacturing method, problems such as a smoke phenomenon occur during the building, or impurities are mixed in the additively manufactured product. Therefore, the amount of Cu is set to 0.001 to 0.25% when positively added.

The lower limit of the amount of Cu is preferably 0.002%, more preferably 0.005%, when positively added. The upper limit of the amount of Cu is preferably 0.1%, more preferably 0.01%.

(Unavoidable Impurities)

In the alloy according to the present embodiment, the remainder with respect to the above-described main constituent elements and sub-constituent elements is composed of Ni and unavoidable impurities. The alloy according to the present embodiment is allowed to be mixed with impurities mixed in the raw material or impurities brought in according to the conditions of materials, manufacturing facility, and the like. Specific examples of unavoidable impurities include P, S, Sn, As, Pb, N, O, and the like.

The amount of the unavoidable impurities for each element is preferably 1% by mass or less, more preferably 0.1% by mass or less, still more preferably 0.01% by mass or less, still more preferably not more than the detection limit. In particular, the amount of P is preferably 0.01% by mass or less. The amount of S is preferably 0.01% by mass or less, more preferably 0.003% by mass or less. In particular, the amount of N is preferably 0.003% by mass or less.

The chemical composition of the alloy can be analyzed by energy dispersive X-ray spectroscopy (EDX), inductively coupled plasma (ICP) emission spectroscopy, and the like. The value of Expression (I) of the present invention can be calculated, for example, by converting the weight of each element measured by the ICP analysis result from the atomic weight and the overall ratio into a molar ratio.

According to the above alloy, the above-described chemical composition forms a matrix phase having a high Mo content and a carbide having a high hardness, and thus both excellent corrosion resistance and excellent wear resistance can be achieved. Further, the amount of C or Cr of the alloy is relatively suppressed, and the amount of carbides and brittle intermetallic compounds formed is appropriately controlled, and thus the crack resistance is improved. This alloy is suitably used as a material for an alloy member having crack resistance or a Ni—Cr—Mo-based alloy powder suitable for an additive manufacturing method.

<Form of Alloy>

The alloy according to the present embodiment can be in an appropriate form such as an alloy mass, an alloy member, and an alloy powder as long as the alloy has the above-described chemical composition. Further, the alloy according to the present embodiment can be made from the molten metal having the above-described chemical composition into a cast by die casting or the like, a rolled product by a direct rolling method or the like, or the like, as long as the alloy has the above-described chemical composition.

The alloy mass may be any of ingot, slab, billet and the like. The shape of the alloy mass can be an appropriate shape such as a rectangular parallelepiped shape, a flat plate shape, a columnar shape, a rod shape, or have an appropriate dimension, depending on the application or the like. For example, the alloy mass can be made by a general casting method or the like in which the alloy is melted in a melting furnace and then the molten metal is poured into a predetermined mold and solidified. As the melting furnace, a furnace that converts electric energy into heat energy for dissolution, an electric resistance furnace that uses Joule heat, a low frequency induction furnace that uses an induced current, a high frequency induction furnace that uses eddy current, and the like can be used.

The alloy member and the alloy powder will be described below.

<Alloy Member>

The alloy member according to the present embodiment can also be manufactured as an additively manufactured product or any of a cast, a rolled product, or a forged product, as long as the alloy member has the above-described chemical composition. The additively manufactured product can be manufactured by an additive manufacturing method using the alloy powder as a material. Rolled products and forged products can be manufactured by a method of processing, molding, and heat-treating an alloy mass, or a method of directly molding, processing, and heat-treating a molten metal.

The application or shape of the alloy member according to the present embodiment is not particularly limited. With respect to the alloy member according to the present embodiment, it is possible to perform appropriate processing such as thermal refining (for example, aging treatment), appropriate heat treatment (for example, annealing), cold working, and hot working, depending on the application as a member, required mechanical properties, and the like.

When the alloy member according to the present embodiment is manufactured as an additively manufactured product, the entire alloy member may be modeled by the additive manufacturing method, or only a part of the alloy member may be modeled by the additive manufacturing method. In other words, the alloy member according to the present embodiment includes a composite member in which powder overlay (metalizing) of the alloy having the above-described chemical composition is performed with respect to a base material of an alloy having the above-described chemical composition.

Specific examples of alloy members include members used for equipment or structures used in applications that require corrosion resistance and wear resistance, such as screws for injection molding or cylinders for injection molding; excavating tools and materials of oil plants or valves, fittings, heat exchangers, or pumps provided in chemical plants; turbines such as generators; compressor impellers; and blades or discs of aircraft engines.

<Alloy Powder>

The alloy powder according to the present embodiment can be a granular material having an appropriate particle shape, an appropriate particle size, and an appropriate particle size distribution as long as the alloy powder has the above-described chemical composition. In the alloy powder according to the present embodiment, the amount of C in the alloy is relatively suppressed, and as will be described later, when integrated with the base material by the additive manufacturing method, a mixed layer by diffusion of carbon or the like is formed and the difference in linear expansion coefficient is reduced. Therefore, the resistance to thermal stress during melting/solidification is high, and the alloy powder is suitable as a material for the additive manufacturing method.

The alloy powder according to the present embodiment may be composed of only the particles of the alloy having the above-described chemical composition, may be a powder obtained by mixing the particles of the alloy having the above-described chemical composition and the particles having another chemical composition into each other, or may be a powder having the above-described chemical composition by a set of particles having any chemical composition.

Further, the alloy powder according to the present embodiment may be manufactured by a mechanical manufacturing method such as mechanical pulverization or mechanical alloying, may be manufactured by a melting/solidification process such as an atomizing method, or may be manufactured by a chemical manufacturing method such as a redox method or an electrolysis method. However, from the viewpoint of using the alloy powder in the additive manufacturing method, it is preferable that the alloy powder be manufactured by a melting/solidification process because spherical particles are easily formed.

The alloy powder according to the present embodiment can be a granulated powder or a sintered powder. The granulated powder is a powder that is granulated such that at least a part of the particles configuring the granular material are coupled to each other. The sintered powder is a powder that is sintered by heat treatment such that at least a part of the particles configuring the granular material are coupled to each other.

From the viewpoint of appropriately adjusting the particle size distribution of the secondary particles, it is preferable to manufacture the sintered powder by a method of first converting the alloy powder into a granulated powder and then firing the granulated powder. For example, the following method can be used as a method of converting the alloy powder into a granulated powder and then firing the granulated powder to obtain a granulated sintered powder.

First, as raw materials, for example, a powder of $Mo_2C$ and a powder containing the remaining chemical components having the above-described chemical composition, for example, a powder of Ni, Cr, Ta, or the like are prepared. Then, the prepared raw material powder is wet-mixed together with a binder. As the binder, it is preferable to use a hydrocarbon-based binder. Examples of the hydrocarbon-based binder include waxes such as paraffin. When the mixture obtained by mixing is spray-dried with a spray dryer, a granulated powder of the mixture having an average particle size $d_{50}$ of 1.0 µm to 200 µm is obtained.

The granulated powder of the mixture is then dried to degrease the binder. The degreasing temperature may be set such that the used binder is sufficiently removed within the required time. The degreasing temperature can be, for example, 400 to 600° C. Then, the granulated powder of the mixture is degreased and then continuously fired to sinter the particles together. The firing temperature is, for example, 1,000° C. or higher, although the firing temperature depends on the chemical composition. When the firing temperature is set to a high temperature of 1,000° C. or higher, the density of the sintered body becomes high, and thus a sintered powder having a large bulk density suitable for improving the packing density can be obtained.

The sintered powder can be, for example, naturally cooled by air cooling or the like, and then classified by sieving classification, dry classification, wet classification, or the like, depending on the purpose.

An average particle size $d_{50}$ of the powder of $Mo_2C$ used as a raw material is preferably 5 µm or less, more preferably 0.1 to 1.0 µm in the cumulative particle size distribution measured by a laser diffraction/scattering type particle size distribution. An average particle size $d_{50}$ of the powder containing the remaining chemical components is preferably 0.1 to 50.0 µm, more preferably 0.1 to 20.0 µm. An average particle size $d_{50}$ of the binder powder is preferably 0.1 to 1.0 µm.

When such a raw material is used, as a result of spray drying, a granulated powder having excellent coupling between particles, sufficiently dispersed C, and an average particle size $d_{50}$ of 1.0 to 200 µm can be efficiently obtained. When such a granulated powder is fired to obtain the sintered powder and then classified such that the average particle size $d_{50}$ is 20 to 100 µm, an alloy powder having a highly uniform particle size suitable for the additive manufacturing method can be obtained.

By using the method of converting the above alloy powder into a granulated powder and then firing the granulated powder to obtain a granulated sintered powder, while the particles configuring the granular material can be sufficiently coupled to each other by sintering, the binder used for the granulation operation can be reliably removed from the granular material. In general, when the degreased granulated powder is used as it is in the additive manufacturing method by the directed energy deposition method, the granulated powder is easily crushed during supply to the modeling region. On the other hand, in a case of the granulated sintered powder, since the particles are firmly coupled to each other by sintering, pulverization during building is suppressed, and defects or non-uniformity of chemical composition during melting/solidification due to oxidation and mixing of impurities can be reduced.

The alloy powder may be spheroidized before being used in the additive manufacturing method. As the spheroidizing treatment, a thermal plasma droplet refining (PDR) method, a heat treatment at a high temperature, or the like can be used. The PDR method is a method of introducing powder into plasma and performing heat treatment at a high temperature. According to the PDR method, a part or all of the particles configuring the granular material are instantly melted and solidified, and thus particles close to a true sphere can be obtained by surface tension. Since the surface of the particles becomes smooth or the fluidity as a granular material becomes high, the modeling accuracy of the additively manufactured product can be improved. In addition, defects during melting/solidification and defects in the solidification structure due to non-uniformity of chemical composition can be reduced.

Further, the alloy powder according to the present embodiment can be manufactured by various atomizing methods. The atomizing method is a method in which molten metal is scattered as droplets by the kinetic energy of a medium sprayed at high pressure, and the molten metal which has become droplets is solidified to form a granular material. As the atomizing method, any of a water atomizing method, a gas atomizing method, a jet atomizing method, and the like can be used.

The water atomizing method is a method in which high-pressure water is sprayed as a spray medium on a molten metal that has flowed down from the bottom of a tundish or the like, and a metal powder is formed by the kinetic energy of the water. Particles formed by the water atomizing method tend to be amorphous. This is because water, which is the spray medium of the water atomizing method, has a faster cooling rate than other atomizing methods. However, the particles formed by the water atomizing method tend to have an irregular shape.

The gas atomizing method is a method of forming a metal powder by spraying an inert gas, such as high-pressure nitrogen or argon or high-pressure air as a spray medium, to a molten metal that has flowed down from the bottom of a tundish or the like. Particles formed by the gas atomizing method tend to be spherical. This is because the cooling rate of the inert gas or air, which is the spray medium of the gas atomizing method, is slower than that of the water atomizing method. It is considered that, since the molten metal which has become droplets formed by the spray medium remains in a liquid state for a relatively long period of time, spheroidization due to surface tension progresses.

The jet atomizing method is a method of forming a metal powder by injecting a high-speed and high-temperature frame jet as a spray medium onto a molten metal that has flowed down from the bottom of a tundish or the like. As the frame jet, a supersonic combustion flame generated by burning kerosene or the like is used. Therefore, the molten metal is accelerated for a relatively long period of time to become fine particles. The particles formed by the jet atomizing method tend to be spherical and have a strong tendency for the particle size distribution to have a small average particle size.

The alloy powder according to the present embodiment is preferably manufactured by the gas atomizing method from the viewpoint of being used in the additive manufacturing method. The particles formed by the gas atomizing method have high sphericity as well as high fluidity as a granular material. Therefore, it is possible to improve the accuracy of the additively manufactured product. In addition, defects during melting/solidification and defects in the solidification structure due to non-uniformity of chemical composition can be reduced.

(Additive Manufacturing Method)

The alloy powder according to the present embodiment can be used in an appropriate additive manufacturing method. In general, the additive manufacturing method with respect to metal materials is broadly classified into a powder bed fusion (PBF) method and a directed energy deposition (DED) method.

The powder bed fusion (PBF) method is a method of forming a powder bed by spreading metal powder on a base material, irradiating the metal powder spread in the target region with a beam, and melting/solidifying the metal powder. In the PBF method, every time two-dimensional building is performed with respect to the powder bed, three-dimensional building is performed in which the spreading of the powder bed and the melting/solidification of the metal powder are repeated.

The powder bed fusion (PBF) method includes a method using a laser beam as a heat source and a method using an electron beam as a heat source. The method using a laser beam is broadly classified into a selective laser melting (SLM) method and a selective laser sintering (SLS) method. The method using an electron beam is called a selective electron beam melting (SEBM, or simply EBM) method.

The selective laser melting (SLM) method is a method of melting or sintering a metal powder with a laser beam. The selective laser sintering (SLS) method is a method of sintering a metal powder with a laser beam. In the SLM method or the SLS method using a laser beam, melting/solidification of a metal powder are promoted in an inert atmosphere such as nitrogen gas.

The selective electron beam melting (SEBM/EBM) method is a method of melting a metal powder using an electron beam as a heat source. The EBM method using an electron beam is performed by irradiating a metal powder with an electron beam and converting kinetic energy into heat to melt the metal powder. In the EBM method, irradiation of an electron beam or melting/solidification of a metal powder are promoted under a high vacuum.

On the other hand, the directed energy deposition (DED) method is a method in which the metal powder is supplied and the beam irradiation is performed onto the base material or toward the already modeled modeling region, and the metal powder supplied to the modeling region is melted/solidified for modeling. In the DED method, scanning with the supply of the metal powder and the beam irradiation two-dimensionally or three-dimensionally is performed, and three-dimensional building is performed in which the solidified metal is repeatedly deposited on the previous layer.

The DED method is also called a metal deposition method. The DED method includes a laser metal deposition (LMD) method in which a laser beam is used as a heat source and a method in which an electron beam is used as a heat source. Among the DED methods, a method of applying powder overlay to a base material using a laser beam is also called laser powder metal deposition.

Of the various additive manufacturing methods, the powder bed fusion (PBF) method has the advantage of high shape accuracy of the additively manufactured product. On the other hand, the directed energy deposition (DED) method has an advantage in that high-speed building is possible. In particular, among the powder bed fusion (PBF) methods, in the selective laser melting (SLM) method, selective melting/solidification of the metal powder are possible when a powder bed with a thickness of several tens of μm is irradiated with a laser having a small beam diameter.

<Particle Size Distribution of Alloy Powder>

In the alloy powder according to the present embodiment, the range of the average particle size $d_{50}$ corresponding to the powder integration frequency of 50% by volume in the cumulative particle size distribution measured by a laser diffraction/scattering type particle size distribution is preferably 5 to 500 μm. In the additive manufacturing method, melting/solidification are promoted for each set of powder to some extent. When the particle size of the alloy powder is extremely small, the beads also become small, and thus defects such as interfacial fracture of the beads are likely to occur. On the other hand, when the particle size of the alloy powder is extremely large, the beads also become large, and thus defects due to non-uniform cooling rate are likely to occur. However, when the average particle size $d_{50}$ is within the range of 5 to 500 μm, an additively manufactured product with few defects can be easily obtained.

However, the optimum particle size or particle size distribution of the alloy powder differs depending on the type of additive manufacturing method. Therefore, it is preferable to adjust the particle size or particle size distribution of the alloy powder according to the type of the additive manufacturing method. In the alloy powder according to the present embodiment, an average particle size $d_{50}$ is preferably within the range of 10 to 250 μm, more preferably within the range of 20 to 150 μm, from the viewpoint of being used in the powder bed fusion (PBF) method or the directed energy deposition (DED) method.

For example, in the selective laser melting (SLM) method, the average particle size $d_{50}$ corresponding to the powder integration frequency of 50% by volume in the cumulative particle size distribution measured by a laser diffraction/scattering type particle size distribution is preferably 10 to 60 μm, more preferably 20 to 40 μm. A particle size $d_{10}$ corresponding to the integration frequency of 10% by volume is preferably 5 to 35 μm. A particle size $d_{90}$ corresponding to the integration frequency of 90% by volume is preferably 20 to 100 μm.

In the SLM method, when the particle size of the metal powder is less than 10 μm, the depositability or ductility as a granular material is deteriorated, and thus the powder built as a powder bed tends to be biased. Further, when the particle size exceeds 100 μm, melting by the beam tends to be incomplete, and thus defects occur in the solidification structure or the surface roughness becomes large. However, with the above-described particle size, it is easy to form a flat and uniform thickness powder bed, and it is also easy to repeatedly spread the powder beds, and thus, an additively manufactured product with few defects can be easily obtained.

Further, in the laser metal deposition (LMD) method and the powder bed type selective electron beam melting (EBM) method, the average particle size $d_{50}$ corresponding to the powder integration frequency of 50% by volume in the cumulative particle size distribution measured by a laser diffraction/scattering type particle size distribution is preferably 30 to 250 μm, more preferably 60 to 120 μm. A particle size $d_{10}$, corresponding to the powder integration frequency of 10% by volume is preferably 15 to 100 μm. A particle size $d_{90}$ corresponding to the powder integration frequency of 90% by volume is preferably 50 to 500 μm.

In the LMD method, when the average particle size of the metal powder is small, the flow of the powder conveyed to the nozzle head tends to be biased, and thus it becomes difficult to stably supply the metal powder to the molten pool. Further, when the particle size exceeds approximately 500 μm, the metal powder is clogged in the nozzle head or the like, melting becomes incomplete, defects occur in the solidification structure, or the surface roughness is large. On the other hand, in the EBM method, when the average particle size of the metal powder is small, the smoke phenomenon is likely to occur. However, in a case of the above-described particle size, the supply of the metal powder to the molten pool or the non-scattering properties of the metal powder is improved, and thus a highly accurate additively manufactured product can be easily obtained.

The particle size distribution or the particle size can be measured by a laser diffraction/scattering type particle size distribution measuring device. The average particle size is obtained as a particle size corresponding to a volume of 50% integrated from the side with a small particle size, in an integrated distribution curve showing a relationship between the volume integrated value obtained by integrating the volumes of the particles in the order from the particles having the smallest particle size to the particles having the larger particle size, and the particle size in the volume integrated value.

<Composite Member Using Alloy>

The composite member (member) using the alloy according to the present embodiment can be obtained by integrating the alloy member having the above-described chemical composition or the alloy layer formed of the alloy powder having the above-described chemical composition with other members. As a method of integration, an appropriate method such as welding, soldering, brazing, mechanical bonding, diffusion bonding can be used.

FIG. 1 is a sectional view schematically showing an example of the composite member using the alloy according to the present embodiment.

FIG. 1 shows, as an example of the composite member using the alloy according to the present embodiment, a composite member in which powder overlay (metalizing) of an alloy having the above-described chemical composition is applied to a base material made of a material different from that of the alloy having the above-described chemical composition.

As shown in FIG. 1, a composite member 4 using the alloy according to the present embodiment includes a base material 1 made of a material different from that of the alloy having the above-described chemical composition; and an alloy layer 2 formed of the alloy having the above-described chemical composition on the surface of the base material 1. The composite member 4 can be manufactured by a directed energy deposition (DED) type additive manufacturing method using the alloy powder.

The shape or material of the base material 1 is not particularly limited. As the base material 1, for example, a Fe-based alloy, a Ni-based alloy, or the like can be used. Further, the shape, thickness, and the like of the alloy layer 2 are not particularly limited. In FIG. 1, as the alloy layer 2, a columnar layer formed by powder overlay is formed on the surface of the base material 1. However, the alloy having the above-described chemical composition may be formed as a thin-film coating that covers the surface of the base material for heat resistance, wear resistance, and the like, or as an additively manufactured product having a predetermined three-dimensional shape.

In the related art, in many cases, composite members of alloys and dissimilar materials are manufactured by a sintering method or a HIP method. However, since the linear expansion coefficient is usually different between the alloy and the dissimilar material, the alloy is easily peeled off from the dissimilar material in the cooling process after sintering. On the other hand, the composite member 4 using the alloy according to the present embodiment can be manufactured by the additive manufacturing method using the alloy powder having the above-described chemical composition as a material.

Since C, of which the amount is equal to or greater than the solid solubility limit of the matrix phase, is added to the alloy powder used in the manufacturing of the composite member 4, in the process of melting/solidification of the alloy powder, a mixed layer 3 is formed by the diffusion of carbon and the like between the base material 1 and the alloy layer 2. The mixed layer 3 has an intermediate chemical composition between the base material 1 and the alloy layer 2 due to the diffusion of carbon and the like during melting/solidification. Further, although the alloy powder is a carbide dispersive type, the amount of C in the alloy is relatively suppressed. Since the difference in linear expansion coefficient between the base material 1 and the alloy layer 2 becomes smaller depending on the mixed layer 3 or the amount of C, the adhesion of the alloy layer 2 can be improved and peeling can be prevented.

Similar to the above-described alloy member, specific examples of composite member that uses the alloy having the above-described chemical composition include members used for equipment or structures used in applications that require corrosion resistance and wear resistance, such as screws for injection molding or cylinders for injection molding; excavating tools and materials of oil plants or valves, fittings, heat exchangers, or pumps provided in chemical plants; turbines such as generators; compressor impellers; and blades or discs of aircraft engines. Further, examples of mold repair include molds to which powder overlay was performed.

<Solidification Structure of Alloy>

The solidification structure of the alloy according to the present embodiment is mainly a face-centered cubic (FCC) structure in a cast state, and is a metal structure having a metal phase (matrix phase) mainly composed of a metal element and carbides. The carbide phase is mainly composed of one or two types of carbides out of four types, such as $M_2C$ type, MC type, $M_6C$ type, or $M_{12}C$ type. Even in the solidification structure in a cast state, a sufficient amount of carbides is crystallized in the matrix phase, and thus excellent wear resistance can be obtained.

In the alloy member according to the present embodiment or the alloy powder according to the present embodiment, the amount of Mo contained in the metal phase (matrix phase) having the FCC structure is 15% by mass or more, preferably 17% by mass or more. In such a matrix phase having a high Mo content, Ta, Nb, Ti, V, or Zr added to the alloy preferentially form carbides, and the concentration of Mo in the carbides or at the grain boundary is suppressed. Accordingly, as shown in Table 3, excellent corrosion resistance can be obtained even though the material is a carbide dispersive reinforcing material. In particular, Nb is preferable because, when formed as a carbide, the potential difference from the metal phase becomes small and an alloy having particularly high corrosion resistance can be formed.

When the alloy according to the present embodiment is cooled from the liquidus temperature or higher to the solidus temperature or lower, eutectic carbides are crystallized in the matrix phase and the solidification structure becomes dendrite-like shape in a cast state. Therefore, it is possible to confirm whether or not melting/solidification of the alloy were performed by observing the presence or absence of a dendrite-like solidification structure. When melting/solidification of the alloy were performed, it can be said that the adhesion at the interface with dissimilar materials is improved as compared with a case of the sintered body.

In the alloy member according to the present embodiment or the alloy powder according to the present embodiment, an area ratio of an intermetallic compound obtained by observing a cross section of a solidification structure with an electron microscope is preferably 35% or less, more preferably 20% or less, still more preferably 10% or less. In general, when the amount of Ta, Nb, Ti, V, and Zr added is large, a large amount of intermetallic compounds such as a P phase are crystallized. Intermetallic compounds such as a P phase have an extremely complicated crystal structure and are hard and brittle. Therefore, when the amount of crystallization increases, the crack resistance is significantly reduced. However, since the alloy according to the present embodiment has a small area ratio of the intermetallic compound, excellent crack resistance can be obtained even in a solidification structure in a cast state.

The alloy member according to the present embodiment or the alloy powder according to the present embodiment can obtain a hardness of 40 HRC or higher in a cast state. The obtained hardness is preferably 45 HRC or higher, more preferably 50 HRC or higher. Further, with such hardness, the corrosion rate when immersed in boiling 10% sulfuric acid for 24 hours is 1.0 $g \cdot m^{-2} \cdot h^{-1}$ or less.

Although the embodiments of the present invention have been described above, the present invention is not limited to the above-described embodiments, and various modifications can be made without departing from the spirit of the present invention. For example, the present invention is not necessarily limited to those having all the configurations included in the above-described embodiment. It is possible to replace a part of the configuration of one embodiment with another, add a part of the configuration of one embodiment to another, or omit a part of the configuration of one embodiment.

EXAMPLES

Hereinafter, the present invention will be specifically described with reference to Examples, but the technical scope of the present invention is not limited thereto.

[Fabrication of Alloy Mass]

In order to confirm the appropriate amount or appropriate ratio of the chemical component of the alloy according to the present invention, an alloy mass was fabricated by a casting method. It can be said that the alloy mass fabricated by the casting method pseudo-reproduces the solidification structure of the alloy member according to the present invention or the alloy powder according to the present invention in a cast state.

The following nine types of raw materials of alloys were prepared and weighed so as to have the chemical composition shown in Table 1.

Ni: Spherical grains with a diameter of 8 to 15 mm,
Cr: Powder with a particle size of 63 to 90 μm,
Mo: Fine powder with an average particle size of approximately 1.5 μm,
Ta: Powder with a particle size of 45 μm or less,
$Mo_2C$: Fine powder with a particle size of 3 to 6 μm,
C: Spherical grains with a diameter of 1 to 2 mm,
Nb: 3 to 5 mm crushed grains,
Ti: 1 to 3 mm crushed grains,
V: 5 mm crushed grains.

TABLE 1

| | % by mass | | | | | | | | | (Ta + 0.7Nb + Ti + 0.6V + Zr)/C |
|---|---|---|---|---|---|---|---|---|---|---|
| | Ni | Cr | Mo | Ta | Nb | Ti | V | Zr | C | |
| Comparative Example 1 | 59.2 | 19 | 19 | 1.8 | 0 | 0 | 0 | 0 | 1 | 0.12 |
| Comparative Example 2 | 58.7 | 19 | 19 | 1.8 | 0 | 0 | 0 | 0 | 1.5 | 0.08 |
| Comparative Example 3 | 58.2 | 19 | 19 | 1.8 | 0 | 0 | 0 | 0 | 2 | 0.06 |
| Comparative Example 4 | 53.7 | 19 | 24 | 1.8 | 0 | 0 | 0 | 0 | 1.5 | 0.08 |
| Comparative Example 5 | 48.7 | 19 | 29 | 1.8 | 0 | 0 | 0 | 0 | 1.5 | 0.08 |
| Comparative Example 6 | 54.5 | 19 | 19 | 6 | 0 | 0 | 0 | 0 | 1.5 | 0.27 |
| Comparative Example 7 | 46.7 | 19 | 19 | 1.8 | 0 | 12 | 0 | 0 | 1.5 | 2.09 |
| Comparative Example 8 | 52.7 | 19 | 19 | 1.8 | 0 | 0 | 0 | 0 | 1.5 | 0.44 |
| Example 1 | 48.5 | 19 | 19 | 12 | 0 | 0 | 0 | 0 | 1.5 | 0.53 |
| Example 2 | 37.5 | 19 | 19 | 23 | 0 | 0 | 0 | 0 | 1.5 | 1.02 |
| Example 3 | 51.5 | 19 | 19 | 1.8 | 7.74 | 0 | 0 | 0 | 1 | 0.82 |
| Example 4 | 49.7 | 19 | 19 | 1.8 | 9 | 0 | 0 | 0 | 1.5 | 0.62 |
| Example 5 | 46.7 | 19 | 19 | 1.8 | 12 | 0 | 0 | 0 | 1.5 | 0.80 |
| Example 6 | 43.7 | 19 | 19 | 1.8 | 15 | 0 | 0 | 0 | 1.5 | 0.98 |
| Example 7 | 42.7 | 19 | 19 | 1.8 | 15.47 | 0 | 0 | 0 | 2 | 0.76 |
| Example 8 | 38.4 | 19 | 19 | 1.8 | 19.34 | 0 | 0 | 0 | 2.5 | 0.75 |
| Example 9 | 52.7 | 19 | 19 | 1.8 | 0 | 6 | 0 | 0 | 1.5 | 1.08 |
| Example 10 | 52.7 | 19 | 19 | 1.8 | 0 | 0 | 6 | 0 | 1.5 | 0.65 |
| Example 11 | 46.7 | 19 | 19 | 1.8 | 0 | 0 | 12 | 0 | 1.5 | 1.21 |

Next, these raw materials were placed in an alumina crucible and mixed. The mixed raw material powder was dissolved in a high-frequency induction melting furnace and then poured into a water-cooled copper mold to obtain an ingot. A test piece having a predetermined shape was fabricated from the ingot of each sample material melted so as to have the chemical composition shown in Table 1, and hardness measurement (wear resistance evaluation) and corrosion resistance evaluation were performed.

(Hardness Measurement)

The cross section of each sample material after cutting was polished to a mirror surface using emery paper and diamond abrasive grains. Then, the Vickers hardness was measured at room temperature with a load of 1,000 gf and a holding time of 15 seconds using a Vickers hardness tester. The measurement was performed 10 times, and the average value of 8 points excluding the maximum value and the minimum value was recorded. The measured Vickers hardness (HV) was converted to Rockwell hardness (HRC). For conversion, Table 2 of American Society for Testing and Materials (ASTM) E140 was referred to. A case of 40 HRC or more was regarded as "excellent", and a case of less than 40 HRC was regarded as "poor". Table 2 shows the measured values and evaluation results.

(Corrosion Resistance Evaluation)

Each sample material was cut into 10 mm×10 mm×2.5 mm, the entire surface of the test piece was polished to water resistant emery paper #1,000, and then degreased with acetone and ethanol, and used for a corrosion test. Before the start of the corrosion test, the dimensions and mass of each test piece were measured. Then, each test piece was immersed in boiling 10% $H_2SO_4$ for 24 hours. Then, the test pieces were taken out from the corrosive liquid, the mass of each test piece was measured, and the corrosion rate was obtained from the mass change. In addition, the corrosion form of the appearance of the test piece was observed with a scanning electron microscope (SEM).

The corrosion rate was calculated by the following Equation (1).

$$s = (g_0 - g_a)/(A \times t) \quad (1)$$

Here, s is the corrosion rate [$g \cdot m^{-2} \cdot h^{-1}$], $g_0$ is the mass [g] of the test piece before being immersed in the corrosive liquid, $g_a$ is the mass [g] of the test piece after being immersed in the corrosive liquid, A is the surface area [$m^2$] of the sample, and t is the immersion time [h] in the corrosive liquid.

The corrosion test was performed three times for each sample material. The result with the highest corrosion rate was taken as a representative value of the corrosion rate of the sample material. A case where the corrosion rate was 1.0 $g \cdot m^{-2} \cdot h^{-1}$ or less was regarded as "excellent", and a case where the corrosion rate was higher than 1.0 $g \cdot m^{-2} \cdot h^{-1}$ was regarded as "poor". Table 2 shows the measured values and evaluation results.

TABLE 2

| | Hardness | | Corrosion resistance | |
|---|---|---|---|---|
| | Measured value [HRC] | Pass/Fail | Measured value [$g \cdot m^{-2} \cdot h^{-1}$] | Pass/Fail |
| Comparative Example 1 | 36.2 | Poor | 12.68 | Poor |
| Comparative Example 2 | 43.9 | Excellent | 18.03 | Poor |
| Comparative Example 3 | 50.9 | Excellent | 54.31 | Poor |
| Comparative Example 4 | 55.3 | Excellent | 6.98 | Poor |
| Comparative Example 5 | 58.8 | Excellent | 2.72 | Poor |
| Comparative Example 6 | 45.6 | Excellent | 13.52 | Poor |
| Comparative Example 7 | 64.2 | Excellent | 65.61 | Poor |
| Comparative Example 8 | 52.1 | Excellent | 2.23 | Poor |
| Example 1 | 56 | Excellent | 0.58 | Excellent |
| Example 2 | 61.5 | Excellent | 0.031 | Excellent |
| Example 3 | 40.1 | Excellent | 0.097 | Excellent |
| Example 4 | 49.7 | Excellent | 0.28 | Excellent |
| Example 5 | 51 | Excellent | 0.092 | Excellent |
| Example 6 | 52.3 | Excellent | 0.08 | Excellent |
| Example 7 | 52.3 | Excellent | 0.087 | Excellent |
| Example 8 | 57.6 | Excellent | 0.084 | Excellent |
| Example 9 | 45.4 | Excellent | 0.43 | Excellent |
| Example 10 | 46.7 | Excellent | 0.60 | Excellent |
| Example 11 | 44 | Excellent | 0.83 | Excellent |

As shown in Table 2, all of Examples 1 to 11 had excellent hardness and corrosion resistance. On the other hand, in Comparative Example 1, the amount of C was small and the hardness was less than HRC 40. In Example 3, the amount of C was the same as that of Comparative Example 1, but the hardness was HRC 40 or more because Nb was added. Further, in Comparative Examples 1 to 8, since (Ta+0.7Nb+Ti+0.6V+Zr)/C was not in the range of 0.5 to 1.5, the corrosion rate was higher than 1.0 $g \cdot m^{-2} \cdot h^{-1}$.

(Crystal Structure Analysis)

FIG. 2 is a diagram showing results of crystal structure analysis by X-ray diffraction measurement of Examples and Comparative Examples.

FIG. 2 shows diffraction spectra obtained by X-ray diffraction (XRD) measurement for Examples 1, 5, 9, and 10 and Comparative Examples 2 and 7. In the XRD measurement, the radiation source was Cu, the tube voltage was 48 kV, the tube current was 28 mA, the sampling interval was 0.02°, and the scanning range was 2θ=20 to 100°. As the measurement sample, a sample cut out from each sample material and then polished to water resistant emery paper #1,000 was used.

As shown in FIG. 2, for Examples 1, 5, and 9, the main peak attributed to the FCC structure was measured. However, in Examples 1, 5, and 9, peaks of the MC type carbides or the $M_6C$ or $M_{12}C$ type carbides were also observed. It is considered that the peak of the high-strength carbide was measured because Ta (Example 1), Nb (Example 5), and Ti (Example 9), which have a lower free energy for forming carbides, were added.

On the other hand, in Comparative Example 2, a peak of the FCC structure and a peak of the $M_2C$ type carbide were observed. It is considered that the peak of the $M_2C$ type carbide was measured because the amount of elements having a high carbide forming ability was small and the carbides (Mo tends to form $Mo_2C$) mainly composed of Mo were formed. In Comparative Example 7, in addition to the MC type carbide, peaks of the P phase ($Mo_3(Mo,Cr)_5Ni_6$), which is an oblique crystalline intermetallic compound, and the γ' phase ($Ni_3Ti$), which is a hexagonal intermetallic compound were observed. It is considered that the peak of the high-strength intermetallic compound was measured because the amount of Ti was extremely large for the amount of C added. It can be said that these intermetallic compounds are not preferable because the crystal structure is complicated, hard and brittle, and the crack resistance is lowered.

Further, in Example 5, a peak estimated to be the P phase was observed. However, in Example 5, it is considered that, since the peak intensity of the P phase is lower than that of Comparative Example 7, the amount of P phase formed is extremely small.

In addition, in Comparative Example 10, similar to Comparative Example 2, a peak of the FCC structure and a peak of the $M_2C$ type carbide were observed. It is considered that the peak of the $M_2C$ type carbide was measured instead of the MC type carbide because the added V is more likely to form the $M_2C$ type carbide than the MC type carbide.

From the above results, it was found that the crystal structure of the V additive was FCC+$M_2C$ carbide, and the crystal structure of the Ta/Nb/Ti additive was mainly FCC+MC carbide+$M_6C/M_{12}C$ carbide. It was also found that as the amount of Nb, Ta, Ti, and V added increased, intermetallic compounds such as a P phase were formed. Further, as in Comparative Example 7, it was found that, when (Ta+0.7Nb+Ti+0.6V+Zr)/C exceeded 1.5, the amount of the intermetallic compound formed increased. From the above, it can be seen that the range of the composition for forming carbides without deficiency and excess with respect to the added amount of C is the exponential value=0.5 to 1.5. It is considered that, when an excess of elements having a high carbide forming ability is added beyond this range, these elements that are not associated with carbon form intermetallic compounds.

(Structure Observation)

FIG. 3 is a backscattered electron image of the crystal structure of Examples and Comparative Examples, which is taken by the scanning electron microscope.

FIGS. 3A and 3B are Comparative Example 2, FIGS. 3C and 3D are Comparative Example 7, FIGS. 3E and 3F are Example 1, FIGS. 3G and 3H are Example 5, FIGS. 3I and 3J are Examples 9, and FIGS. 3K and 3L are backscattered electron images (BEI) of a crystal structure in a cast state of Example 10, which is taken by the scanning electron microscope (SEM). In each drawing, the BEI on the upper figure shows the observation result at low magnification, and the BEI on the lower figure shows the observation result at high magnification.

As shown in FIGS. 3A and 3B, the solidification structure of Comparative Example 2 is a eutectic structure having a matrix phase 5 (a region close to black color) having the FCC structure and an $M_2C$ carbide 6 (a region close to white color). In Comparative Example 2, the matrix phase 5, which is a metallic phase having the FCC structure, exhibited a dendrite-like shape. The $M_2C$ carbide 6 was crystallized so as to surround the matrix phase 5 between the dendrite branches.

As shown in FIGS. 3C and 3D, the solidification structure of Comparative Example 7 is a eutectic structure having a matrix phase 7 (a region close to black color), an MC carbide 8 (a region close to gray color), and a P phase 9 (a region close to white color). According to XRD measurements, the matrix phase 7 is estimated to be mainly an FCC structure. However, it is considered that, since the peak of $Ni_3Ti$ was also confirmed in the XRD measurement, $Ni_3Ti$ is a finely formed γ phase/γ'. It is considered that the reason why a large amount of P phase 9 is formed is that (Ta+0.7Nb+Ti+0.6V+Zr)/C exceeds 1.5 and the amount of Ti is excessive with respect to the amount of C added. It is considered that, since the P phase 9 is hard and brittle, the crack resistance of Comparative Example 7 is low. As a result of image analysis of BEI by binarization, it was found that the area ratio of P phase 9 was 36.7%.

As shown in FIGS. 3E and 3F, the solidification structure of Example 1 is a eutectic structure mainly having a matrix phase 10 (a region close to black color) having the FCC structure, an MC carbide 11 (a region close to white color), and an $M_6C/M_{12}C$ carbide 12 (a region that looks like a streak). The matrix phase 10, which is a metallic phase having the FCC structure, exhibited a dendrite-like shape. In Example 1, no intermetallic compound such as a P phase was confirmed.

As shown in FIGS. 3G and 3H, the solidification structure of Example 5 is a eutectic structure mainly having a matrix phase 13 (a region close to black color) having the FCC structure, an MC carbide 14 (a region close to white color), and an $M_6C/M_{12}C$ carbide 15 (a region that looks like a streak). The matrix phase 13, which is a metallic phase having the FCC structure, exhibited a dendrite-like shape. In Example 5, a peak of the P phase was also confirmed by XRD measurement, but no P phase was observed by microscopic observation. It is considered that the P phase is present in the $M_6C$ carbide or the $M_{12}C$ carbide.

As shown in FIGS. 3I and 3J, similar to Example 1, the solidification structure of Example 9 is a eutectic structure having a matrix phase 16 (a region close to black color) having the FCC structure, an MC carbide 17 (a region close to white color), and an $M_6C/M_{12}C$ carbide 18 (a region that looks like a streak). The matrix phase 16, which is a metallic phase having the FCC structure, exhibited a dendrite-like shape. In Example 9, no P phase was confirmed.

As shown in FIGS. 3K and 3L, the solidification structure of Example 10 is a structure which is not clear at high magnification, but has a matrix phase 19 (a region close to black color) having the FCC structure and particles 20 (a region close to white color) such as carbides. In Example 10, it is considered that, since the FCC structure and the $M_2C$ carbide were confirmed by the XRD measurement, the particles 20 crystallized in the matrix phase 19 are the $M_2C$ carbides. It is considered that the carbide was not clearly confirmed by microscopic observation because the density difference between the matrix phase 19 and the carbide was small, or the carbide was extremely fine.

In Comparative Example 2 and Example 10, $M_2C$ carbides have been confirmed in the matrix phase having the FCC structure. However, since the $M_2C$ carbide has a small effect on crack resistance, Comparative Example 2 and Example 10 are considered to be difficult to crack. Further, in any of Examples 1, 5, and 9, the MC carbide and the $M_6C/M_{12}C$ carbide are confirmed in the matrix phase having the FCC structure. However, it is considered that, since the hard and brittle P phase has not been clearly confirmed, the crack resistance is good. On the other hand, in Comparative Example 7, it is considered that, since the formation of the P phase is clearly observed, the crack resistance is low.

Table 3 shows the results of point analysis of the matrix phase in the crystal structures of Examples and Comparative Examples by energy dispersive X-ray spectroscopy (EDX). The measurement position of the point analysis is a region of the matrix phase in the BEI shown in FIGS. 3A to 3L. Regarding the amount of C, the influence of contamination on the measurement sample is large. Therefore, the total amount was standardized based on the quantitative results of the chemical components excluding C.

TABLE 3

| | % by mass | | | | | | |
|---|---|---|---|---|---|---|---|
| | Ni | Cr | Mo | Ta | Nb | Ti | V | Zr |
| Comparative Example 2 | Bal. | 15.0 | 13.3 | 1.9 | — | — | — | — |
| Comparative Example 7 | Bal. | 18.9 | 12.3 | 0 | — | 6.7 | — | — |
| Example 1 | Bal. | 20.1 | 15.7 | 3.4 | — | — | — | — |
| Example 5 | Bal. | 22.5 | 18.9 | 0 | 4 | — | — | — |
| Example 9 | Bal. | 19.4 | 15.8 | 0 | — | 2.54 | — | — |
| Example 10 | Bal. | 16.9 | 16.5 | 0 | — | — | 3.5 | — |

In any of Comparative Examples 2 and 7 and Examples 1, 5, 9, and 10, the charged value of the amount of Mo is 19%. However, it can be seen that the amount of Mo in the matrix phase is less than 19%. It is considered that, since Mo is a carbide-forming element, a part of Mo is concentrated in the carbide or at the grain boundary. The amount of Mo in the matrix phase of Comparative Examples 2 and 7 is as low as 12 to 14%, whereas the amount of Mo in the matrix phase of Examples 1, 5, 9, and 10 is 15% or more. Since Examples 1, 5, 9, and 10 contain Ta, Nb, Ti, and V in appropriate amounts with respect to C, the effect of suppressing the decrease in the amount of Mo in the matrix phase is exhibited. In particular, it can be said that Nb has a high inhibitory effect from the comparison of the same % by atom and % by mass. As a result, it is considered that Examples 1, 5, 9, and 10 in which the amount of Mo in the matrix phase is high are excellent in corrosion resistance.

Accordingly, it can be said that the amount of Mo in the matrix phase is preferably 15% by mass or more.

FIG. 4 is a diagram showing a relationship between a chemical component and a corrosion rate of Examples and Comparative Examples.

In FIG. 4, the horizontal axis shows the calculated value of (Ta+0.7Nb+Ti+0.6V+Zr)/C of each sample material, and the vertical axis shows the corrosion rate [$g \cdot m^{-2} \cdot h^{-1}$] of each sample material.

As shown in FIG. 4, when (Ta+0.7Nb+Ti+0.6V+Zr)/C is in the range of 0.5 to 1.5, it can be seen that the corrosion rate when immersed in boiling 10% sulfuric acid for 24 hours is low. Accordingly, it can be said that the alloy of this example having such an index value in the range of 0.5 to 1.5 is excellent in corrosion resistance even though the alloy is made of a carbide dispersive reinforcing material.

(Dissolution Test)

The alloy mass of this example was redissolved by a laser beam and then solidified to evaluate the crystal structure. Example 5 was used as the alloy mass. The alloy mass was partially dissolved and then solidified, and the region of the solidification structure formed by resolidification was observed with an electron microscope.

The conditions for redissolution with a laser beam and the cooling conditions after the redissolution are as follows. A plurality of samples were evaluated by changing the scanning rate of the laser beam. The condition that the scanning rate of the laser beam is slow is set to the sample No. 1, and the condition that the scanning rate of the laser beam is high is set to the sample No. 2.

<<Redissolution Conditions>>

Laser beam irradiation device: 2 kW fiber laser
Laser beam output: 1,200 W
Shield gas: Ar
Laser beam incident angle: 10°
Laser beam scanning width: 13 mm
Laser beam scanning rate: 100 mm/min (Sample No. 1)
Laser beam scanning rate: 500 mm/min (Sample No. 2)

FIG. 5 is a backscattered electron image taken by the scanning electron microscope showing a redissolved metal structure in which the alloy was melted and solidified with a laser.

FIG. 5A is a backscattered electron image (BEI) taken by the scanning electron microscope (SEM) showing a metal structure of the sample No. 1 in which the alloy of Example 5 was dissolved and solidified with a laser having a low scanning rate, and FIG. 5B is a backscattered electron image taken by the scanning electron microscope (SEM) showing a metal structure of the sample No. 2 in which the alloy of Example 5 was dissolved and solidified with a laser having a high scanning rate.

As shown in FIG. 5, it can be seen that when the fabricated alloy mass of this example is redissolved with a laser beam, the crystal grain size of the MC type carbide becomes smaller. When comparing the sizes of the MC type carbide 21 when redissolved with a laser having a low scanning rate and the MC type carbide 22 when redissolved with a laser having a high scanning rate, it can be seen that the size when redissolved with a laser having a high scanning rate is smaller.

As a result of image analysis of BEI by binarization, it was found that the average particle size of the MC type carbide was 7.36 μm in Example 5 before redissolution, 1.86 μm in the sample No. 1 after redissolution, and 0.80 μm of the sample No. 2 after redissolution. In general, from the viewpoint of wear resistance, it is preferable that the dispersed particles be finely dispersed rather than a case where the dispersed particles are coarse. Accordingly, the average particle size of the MC type carbide is preferably 7 μm or less, more preferably 2 μm or less.

[Fabrication of Additively Manufactured Product]

Using the raw material alloy powder made of the alloy according to the present invention, an additively manufactured product was fabricated by additively manufacturing by laser metal deposition (LMD). The additively manufactured product was additively manufactured on the base material in a substantially rectangular parallelepiped shape. Each additively manufactured product is referred to as sample No. 3. FIG. 6 shows a photographic image showing an appearance of an additively manufactured product of the sample No. 3. The size of the sample No. 3 is 50 mm in length×17 mm in width×15 mm in height.

By the gas atomizing method, a raw material alloy powder for additive manufacturing having the same alloy composition as in Example 5 was prepared. The atomized powder was classified and a raw material alloy powder having a particle size of 53 to 150 μm was used for additive manufacturing. In the classified raw material alloy powder, $d_{10}$, was 60.0 μm, $d_{50}$ was 93.2 μm, and $d_{90}$ was 148.0 μm.

<<Additive Manufacturing Conditions>>

Device: LASERTEC65 manufactured by DMG Mori Seiki Co., Ltd.

Modeling method: Overlay welding by laser metal deposition (LMD)

Base material: Maraging steel

Laser beam output: 1,800 W

Laser beam scanning rate: 600 mm/min

Raw material powder supply: 9 g/min

Number of additively manufactured layers: 40 layers (Evaluation of Additively Manufactured Product)

Fabricated sample No. 3 (additively manufactured product 23 in FIG. 6) was cut, and the presence or absence of cracks was confirmed by visual observation of the cross section and dye penetrant inspection. As a result, no crack was confirmed. Although a large thermal stress is generated during the building of a large additively manufactured product, it can be said that the sample No. 3 has high crack resistance against hot cracking because no crack was confirmed.

FIG. 7 is a backscattered electron image taken by the scanning electron microscope showing a metal structure of the sample No. 3. As shown in FIG. 7, the metal structure of the sample No. 3 is mainly a eutectic structure having a matrix phase 25 (a region close to black color) having the FCC structure and an MC carbide 24 (a region close to white color). It can be seen that the size of the MC type carbide 24 in the sample No. 3 is approximately 3 μm, which is finer than that of the MC type carbide 14 in the molten material (refer to FIGS. 3G and 3H) of Example 5.

As a result of measuring the hardness of the sample No. 3, it was found that the hardness was 51.6 HRC, which was slightly improved as compared with the molten material of Example 5. This is considered to be due to the carbides that became fine. Moreover, as a result of measuring the area ratio of the intermetallic compound on the backscattered electron image, it was found that the area ratio was approximately 1%. Furthermore, as a result of measuring the amount of Mo of the matrix phase 25 by EDX, it was found that the amount of MO was 18.7% by mass, and the decrease in the amount of Mo was suppressed as in the molten material of Example 5 in which the cast state was reproduced. Accordingly, it can be said that the additively manufactured product using the alloy according to the present invention has good corrosion resistance.

REFERENCE SIGNS LIST

1: base material
2: alloy layer
3: mixed layer
4: composite member
5, 7, 10, 13, 16, 19, 25: matrix phase (FCC phase)
6: $M_2C$ carbide
8, 11, 14, 17, 21, 22, 24: MC type carbide
9: P phase
12, 15, 18: $M_6C/M_{12}C$ carbide
20: particle
23: additively manufactured product

The invention claimed is:

1. An alloy comprising, by mass %:
Cr: 18 to 22%;
Mo: 18 to 28%;
Ta: 1.5 to 57%;
C: 1.0 to 2.5%;
Nb: 0 to 42%;
Ti: 0 to 15%;
V: 0 to 27%;
Zr: 0 to 29%; and
a remainder consisting of Ni and unavoidable impurities, where a molar ratio of (Ta+0.7Nb+Ti+0.6V+Zr)/C=0.5 to 1.5 is satisfied,
wherein the alloy further comprises a metal phase having a face-centered cubic structure and a carbide phase mainly containing any element of Ta, Nb, Ti, V, and Zr.

2. An alloy powder for additive manufacturing, comprising, by mass %:
Cr 18 to 22;
Mo: 18 to 28%;
Ta: 1.5 to 57%;
C: 1.0 to 2.5%;
Nb: 0 to 42%;
Ti: 0 to 15%;
V: 0 to 27%;
Zr: 0 to 29%; and
a remainder consisting of Ni and unavoidable impurities, where a molar ratio of (Ta+0.7Nb+Ti+0.6V+Zr)/C=0.5 to 1.5 is satisfied.

3. The alloy powder according to claim 2, wherein $d_{50}$, which is an average particle size when an integrated value by laser diffraction/scattering type particle size distribution measurement is 50% by volume, is 5 to 500 μm.

4. An alloy member which is an additively manufactured product having a solidification structure, comprising, by mass %:
Cr: 18 to 22%;
Mo: 18 to 28%;
Ta: 1.5 to 57%;
C: 1.0 to 2.5%;
Nb: 0 to 42%;
Ti: 0 to 15%;
V: 0 to 27%
Zr: 0 to 29%; and
a remainder consisting of Ni and unavoidable impurities, where a molar ratio of (Ta+0.7Nb+Ti+0.6V+Zr)/C=0.5 to 1.5 is satisfied, wherein
the solidification structure is a dendrite crystal structure having a metal phase having a face-centered cubic structure and carbides including a carbide phase mainly containing any element of Ta, Nb, Ti, V, and Zr.

5. The alloy member according to claim 4, wherein Mo in the metal phase is 15% by mass or more.

\* \* \* \* \*